(12) United States Patent
Jones et al.

(10) Patent No.: US 8,576,592 B2
(45) Date of Patent: Nov. 5, 2013

(54) POWER CONVERTER WITH LOW RIPPLE OUTPUT

(75) Inventors: Owen Jones, Ipswich (GB); Lawrence R. Fincham, Santa Rosa, CA (US)

(73) Assignee: THX Ltd, San Rafael, CA (US)

( * ) Notice: Subject to any disclaimer, the term of this patent is extended or adjusted under 35 U.S.C. 154(b) by 309 days.

(21) Appl. No.: 12/845,631

(22) Filed: Jul. 28, 2010

(65) Prior Publication Data

US 2011/0075454 A1    Mar. 31, 2011

Related U.S. Application Data

(60) Provisional application No. 61/229,217, filed on Jul. 28, 2009.

(51) Int. Cl.
  *H02M 7/04* (2006.01)
(52) U.S. Cl.
  USPC ................................. 363/67; 363/65; 363/71
(58) Field of Classification Search
  USPC .......................................... 363/17, 65, 67, 71
  See application file for complete search history.

(56) References Cited

U.S. PATENT DOCUMENTS

| | | | |
|---|---|---|---|
| 5,008,795 A | | 4/1991 | Parsley et al. |
| 5,508,903 A | | 4/1996 | Alexandrov |
| 5,801,932 A | | 9/1998 | Hwang et al. |
| 6,697,266 B2 * | 2/2004 | Poon et al. ...................... 363/17 |
| 7,149,096 B2 | | 12/2006 | Batarseh et al. |
| 7,200,014 B1 * | 4/2007 | Hawkes et al. ............... 363/21.1 |
| 7,403,400 B2 | | 7/2008 | Stanley |
| 7,463,498 B1 * | 12/2008 | Djekic et al. .................... 363/25 |
| 7,728,661 B2 * | 6/2010 | Bockelman et al. ............ 330/51 |
| 2004/0252529 A1 | 12/2004 | Huber et al. |
| 2007/0008747 A1 | 1/2007 | Soldano et al. |
| 2007/0090767 A1 * | 4/2007 | Roberts ......................... 315/139 |
| 2009/0196072 A1 * | 8/2009 | Ye ................................... 363/17 |

FOREIGN PATENT DOCUMENTS

| | | |
|---|---|---|
| EP | 0520500 | 12/1992 |
| WO | 03075444 | 9/2003 |

OTHER PUBLICATIONS

A New Approach to Reducing Output Ripple in Switched-Capacitor-Based Step-Down DC—DC Converters. Jifeng Han,, Annette von Jouanne, and Gabor C. Temes, Life Fellow, IEEE, Nov. 2006.*
International Search Report and the Written Opinion of the International Searching Authority, mailed Dec. 1, 2010 for International Patent Publication No. PCT/US2010/043582.

(Continued)

*Primary Examiner* — Adolf Berhane
*Assistant Examiner* — Yemane Mehari
(74) *Attorney, Agent, or Firm* — Irell & Manella LLP

(57) ABSTRACT

A power supply includes two or more input waveforms being shaped or selected so that after being separately level-shifted and rectified, their additive combination results in a DC output waveform with substantially no ripple. The power supply may comprise a waveform generator, a level conversion stage for step up or down conversion, a rectification stage, and a combiner. The waveform generator may generate complementary waveforms, preferably identical but phase offset from each other, such that after the complementary waveforms are level-converted, rectified and additively combined their sum will be constant, thus requiring no or minimal smoothing for generation of a DC output waveform. The level conversion may be carried out using transformers or switched capacitor circuits. Feedback from the DC output waveform may be used to adjust the characteristics of the input waveforms.

55 Claims, 19 Drawing Sheets

(56) References Cited

OTHER PUBLICATIONS

Lee S-C et al., "A Low-Ripple Switched-Capacitor DC-DC Up converter for Low-Voltage Applications," IEICE Transactions on Electronics, Electronics Society, Tokyo, JP , vol. E84-C, No. 8, Aug. 1, 2001, pp. 1100-1103.

Jifeng Han et al., "A New Approach to Reducing Output Ripple in Switched-Capacitor-Based Step-Down DC-DC converters," Industry Applications Conference, 2004, 39th IAS Annual Meeting, Conference Record of the 2004 IEEE Seattle, WA, Oct. 3-7, 2004, pp. 1115-1120.

Search Report and Written Opinion of the Hungarian Intellectual Property Office, dated May 8, 2013, for Singapore Application No. 201200582-3.

\* cited by examiner

POWER CONVERTER WITH LOW RIPPLE OUTPUT

RELATED APPLICATION INFORMATION

This application claims the benefit of U.S. Provisional Application Ser. No. 61/229,217, filed on Jul. 28, 2009, hereby incorporated by reference as if set forth fully herein.

BACKGROUND OF THE INVENTION

1. Field of the Invention

The field of the invention generally relates to power supplies and, more specifically, to a versatile DC output power supply.

2. Background of the Related Art

There are two main classes of power supply or converter: (1) AC to DC, and (2) DC to DC. An AC to DC power supply generally converts AC line voltage as its input to a DC output voltage and is found, for example, in applications such as home audio amplifiers. It can generally be implemented as either a linear or switching power supply. A DC to DC power supply converts from one existing DC voltage to another, for example from a battery, to another higher or lower voltage level. It is typically implemented with a switching power supply. For general use, DC to DC power supplies convert voltages and also provide isolation between input and output.

Common components of a conventional power supply include a transformer, rectifier, and smoothing/storage capacitors. Additional components commonly utilized in a switching power supply include a control IC chip, power transistors, filtering and screening to prevent electro-magnetic interference (EMI). The demand for ever smaller equipment has led to a preponderance of switching power supplies.

Conventional linear power supplies, used for instance in home audio amplifiers, use a large, heavy, expensive transformer to convert a low frequency, high-voltage AC line supply to a lower voltage suitable for the amplifier or other application. The high-voltage AC line supply is first dropped down to a lower AC voltage, and then the lower AC voltage waveform is rectified to DC. However, the rectified voltage is discontinuous and so large storage capacitors are needed in order to provide a smooth voltage for the amplifier. Even so, the DC supply still has an appreciable irregularity (the ripple voltage) superimposed upon the DC which can manifest as an audible hum and buzz at the amplifier output unless considerable care is taken with the amplifier design and layout.

While the design of such a power supply is relatively simple and the EMI emissions relatively low, the transformer is large, heavy and very expensive. The storage capacitors are also large and expensive. Thus the overall bulk of this power supply approach precludes its use on lightweight, low profile designs. The power losses in the power supply are relatively low, with an overall efficiency generally found in the 85-90% range.

An alternative to using linear power supplies is to employ a switched-mode power conversion technique. In this technique, the line voltage is first of all rectified and smoothed at full line voltage. This allows the storage capacitor to be smaller as compared to the linear power supply, and also less expensive. The resulting high voltage DC signal is then converted to a lower voltage by chopping it at a very high frequency—several tens of kHz typically—to produce an AC output signal which is transformed down to a lower voltage through a small transformer. Because the operating frequency is much higher than with a linear power supply, the transformer can be much smaller than in a conventional linear power supply. However, the AC signal on the output side of the transformer again has to be rectified to obtain DC and must still be smoothed with storage capacitors, albeit smaller ones than in a linear power supply. An example of such a power supply is an external power supply generally used to power a laptop computer.

One penalty to be paid in this approach is that, in order to retain efficiency, the chopping of the DC produces high frequency AC with a discontinuous, square waveshape. Such a waveshape generates high levels of very high frequencies which radiate to cause radio frequency interference (EMI). Careful design, layout and screening are required to reduce these emissions to an acceptable limit. The switching frequency components also need to be removed or isolated from the input and output lines, requiring extra magnetic components that add to the cost and bulk of the supply. The efficiency, although theoretically capable of being very high, typically lies in the 80-90% range. Overall, the size and weight of the switched-mode power supply can be reduced considerably compared to a conventional linear power supply and the basic component cost can also be lower. However, the complexities inherent in the design of a switching power supply can add considerably to the design and certification costs and result in a time to market of many months.

In sum, linear power supplies tend to be larger in size and profile, relatively costly, and heavy. They are advantageous in terms of efficiency and low EMI. Switching power supplies tend to be smaller and weigh less. Due to higher frequency operation, the transformers and capacitors of a switching power supply tend to be smaller than with a linear power supply. However, switching power supplies can be less efficient than linear power supplies, and produce significantly more EMI which requires careful filtering and screening. Switching power supplies are also more complex, needing control circuitry and power switching devices. They take longer to design and are generally more expensive than linear power supplies. The trend is towards ever smaller power supplies, requiring higher frequency operation and hence more potential issues relating to EMI.

Larger power supplies may utilize three-phase power generation, which is an alternative power supply technique to the ones thus far described. In a three-phase system, three power lines carry three alternating currents of the same frequency but different phases, which reach their instantaneous peak values at different times. The current waveforms are offset by 120 degrees from one another (that is, each current is offset by one-third of a cycle from the other two waveforms). This staggering of waveforms allows energy to be continuously provided to the load(s), with a reduced but nonetheless substantial ripple. As a result, a constant amount of power is transferred over each cycle of the current. Transformers may be used to step-up or step-down the voltage levels at various points in a three-phase power network. A three-phase rectifier bridge commonly includes six diodes, with two diodes used for each branch of the three-phases.

While three-phase power supply systems have some benefits, they are also subject to certain drawbacks or limitations. For example, a minimum of three conductors or power lines is generally required, as well as three sets of circuitry for level-shifting (with transformers) and rectifying each branch. Also, while ripple is reduced over a single-phase power supply, the ripple is still substantial and in general requires storage capacitors to bring down to an acceptable level.

A need exists for a power supply or converter that can be made small, lightweight and reasonably inexpensive, with minimal EMI. A need further exists for such a power supply that avoids the complexities and complications of a switching power supply. A further need exists for a power supply that can reduce the need for large components and thus be made small in size and profile and lightweight.

SUMMARY OF THE INVENTION

In one aspect, a power supply is provided in which one or more input waveforms are shaped or otherwise selected so that the output waveform requires minimal smoothing for generation of a DC output waveform.

According to one or more embodiments, a power supply is provided having one or more input waveforms are shaped or otherwise selected prior to being provided to an isolating transformer. The nature of the input waveforms is shaped or selected so that the transformed waveform requires no or minimal smoothing for generation of a DC output waveform.

The power supply may comprise a waveform generator, a level conversion stage for stepping the voltage level up (or down), a rectification stage, and a signal combiner. The waveform generator may generate complementary waveforms, such that after each of the complementary waveforms is rectified and combined their sum will be constant, thus requiring no or minimal smoothing for generation of a DC output waveform.

In one embodiment, a DC output power supply comprises a waveform generator, at least one transformer, a rectification stage, and a signal combiner. The waveform generator may generate complementary waveforms, such that after each of the complementary waveforms is rectified and combined their sum will be constant. The complementary waveforms are preferably identical but are 90-degrees out of phase from one another, although in other embodiments the waveforms may have a different relationship. The complementary waveforms are applied to a pair of transformers or a single transformer with separate windings. The outputs of the transformers are provided to the rectification stage, which outputs a pair of rectified signals. The rectified signals have the property that when added together, their sum is constant. The rectified signals are provided to the signal combiner, which sums the signals and produces a constant DC output signal.

In certain embodiments, the output voltage is monitored and fed back to the input side of the power supply, which adjusts the amplitude or other characteristics of the complementary waveform signals prior to being applied to the transformer(s).

In other embodiments, a switched-capacitor technique is used to adjust (e.g., step up) the voltage level of the complementary waveforms, instead of transformer(s). In other respects, the power supply operates in a similar fashion.

Embodiments as described herein may result in one or more advantages, including being smaller, lighter, thinner and/or less expensive than a conventional power supply, with fewer large components, while retaining high efficiency. The power supply can be designed so as to produce minimal or insignificant EMI. Because the power supply can be simpler to design and manufacture, it can be brought to market more quickly, thus resulting in a faster product design cycle.

Further embodiments, alternatives and variations are also described herein or illustrated in the accompanying figures.

DETAILED DESCRIPTION OF PREFERRED EMBODIMENTS

According to one or more embodiments, a power supply is provided having one or more input waveforms are shaped or otherwise selected prior to being provided to an isolating transformer. The nature of the input waveforms is shaped, selected or otherwise generated so that the transformed waveform requires minimal rectification and/or smoothing for generation of a DC output waveform.

Figure 8:
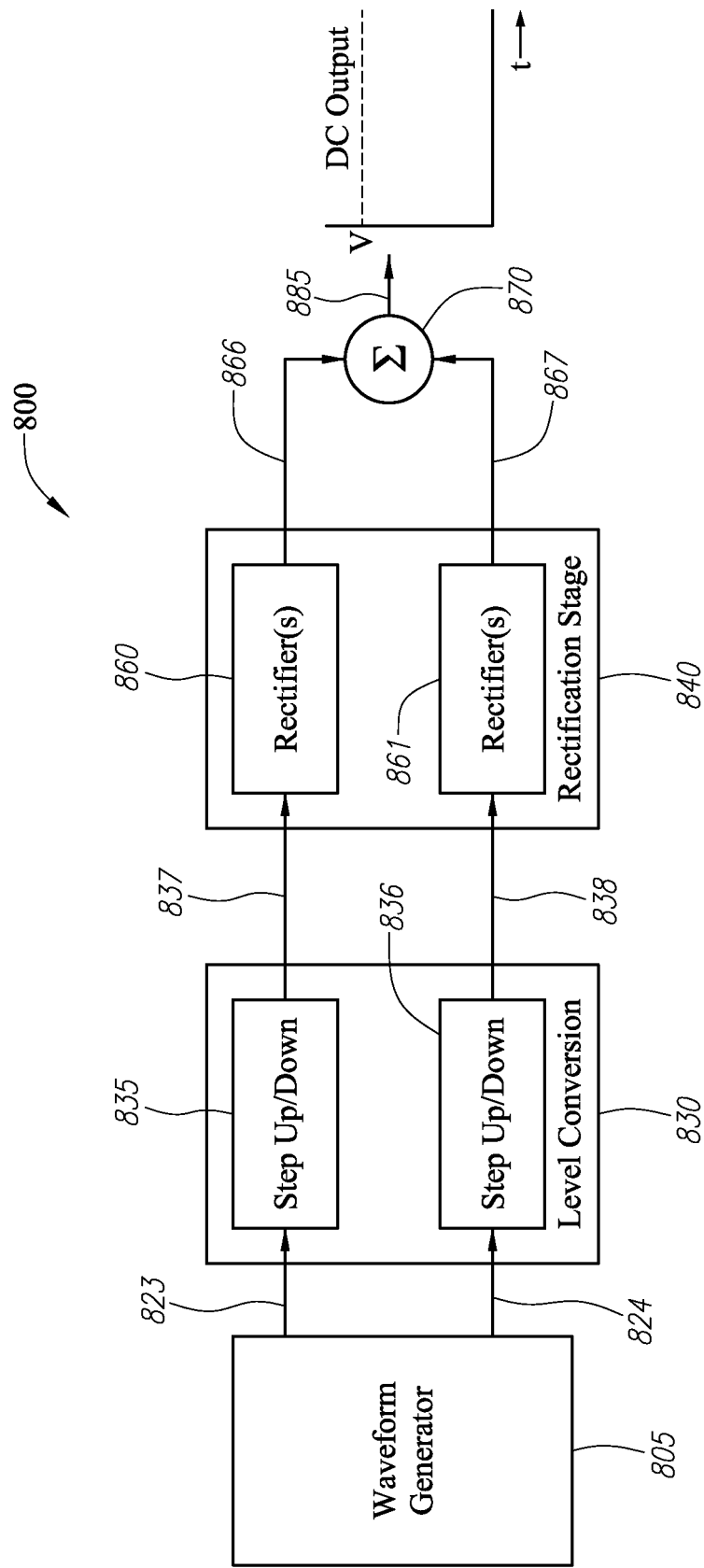
FIG. 8 is a conceptual block diagram of a DC output power supply as disclosed herein.

FIG. 8 is a conceptual block diagram of a power supply 800 as disclosed herein. In FIG. 8, a signal source (waveform) generator 805 generates a pair of complementary waveform signals 823, 824. The complementary waveform signals 823, 824 are selected so as to provide a constant DC output level after being coupled through a level conversion stage 830 to an output (rectification) stage 840 whereupon the level-converted signals are rectified and combined, while minimizing storage/smoothing capacitor requirements in the output stage 840. The complementary waveform signals 823, 824 are preferably of a type as described later herein. The complementary waveform signals 823, 824 are respectively stepped up or down via blocks 835, 836, which may be embodied as one or more transformers or switching capacitor networks, for example, as further detailed herein. The level conversion stage 830 provides signals 837, 838 to the output stage 840. Signal 837 from the first level conversion block 835 is provided to a first rectifier block 860 of the output stage 840. Signal 839 from the second level conversion block 836 is provided to a second rectifier block 861 of the output stage 840. Each of the rectifier blocks 860, 861 may be embodied as, e.g., a full-wave rectifier bridge. The rectified output signals 866, 867 of the rectifier blocks 860, 861 are waveforms that are complementary in nature such that, when summed together, the result is a constant DC level. To this end, rectified output signals 866, 867 are provided to a signal combiner 870, which sums or otherwise combines the rectified output signals 866, 867 and provides a DC output signal 885 that is substantially constant in nature, generally without the need for storage/smoothing capacitors.

Figure 1:
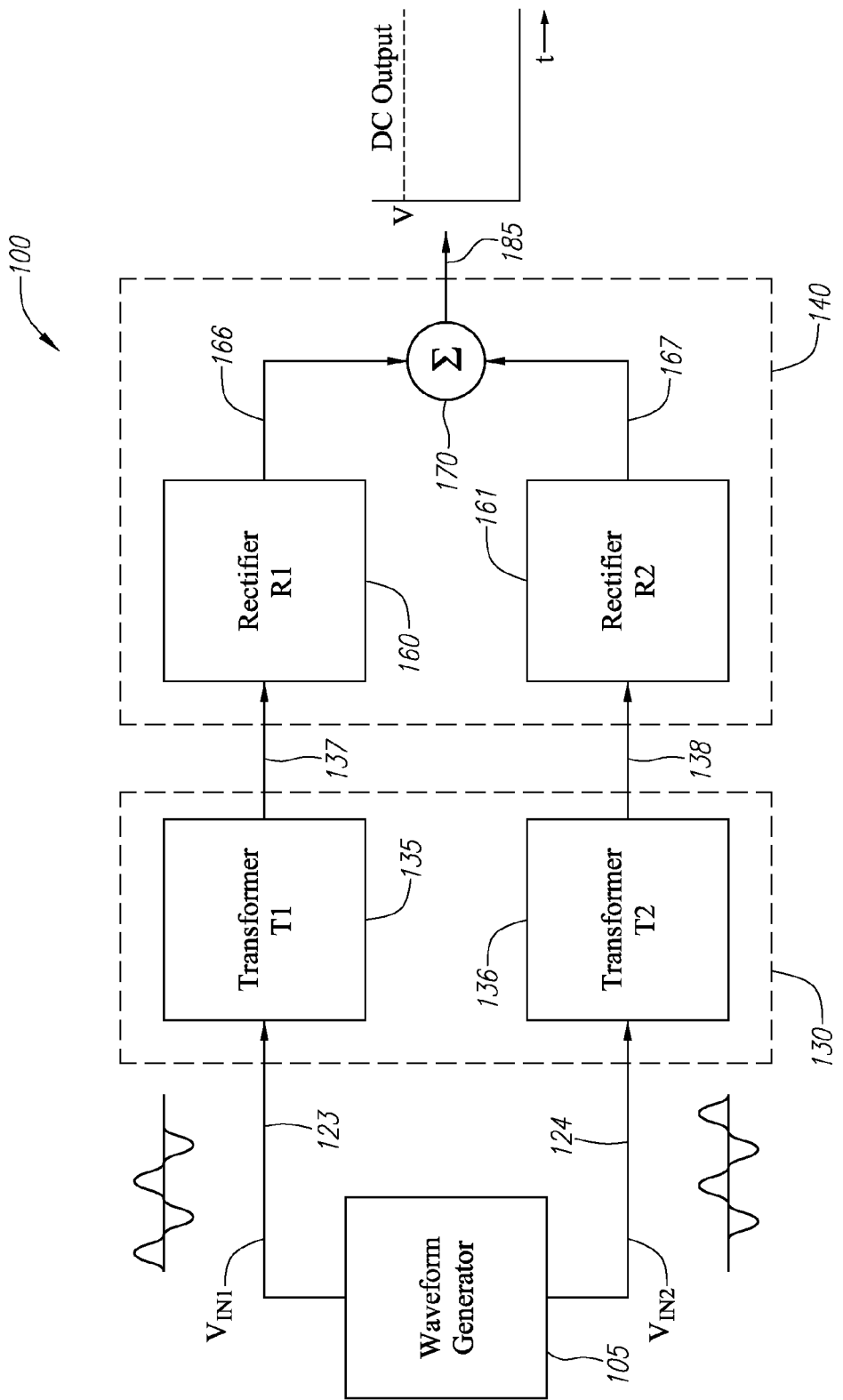
FIG. 1 is a conceptual block diagram of a DC output power supply as disclosed herein, using one or more transformers for signal level conversion.

FIG. 1 is a conceptual block diagram of a DC output power supply 100 as disclosed herein, based on the general principles of FIG. 8, and using one or more transformers for signal level conversion. As shown in FIG. 1, a signal source (waveform) generator 105 generates a pair of complementary waveform signals $V_{IN1}$, $V_{IN2}$ over signal lines 123, 124. The complementary waveform signals $V_{IN1}$, $V_{IN2}$ are selected so as to provide a constant DC output level after being coupled through a transformer stage 130 to an output stage 140 whereupon they are rectified and combined, while minimizing storage/smoothing capacitor requirements in the output stage 140. The complementary waveform signals $V_{IN1}$, $V_{IN2}$ are preferably of a type as described later herein. The complementary waveform signals $V_{IN1}$, $V_{IN2}$ are coupled through transformer stage 130 and, more specifically, through respective transformers 135, 136 of transformer stage 130 to the output stage 140. The transformers 135, 136 may be step-up or step-down in nature, and are preferably identical in characteristics, assuming that the amplitude of the complementary waveform signals $V_{IN1}$, $V_{IN2}$ is the same. Transformers 135, 136 may be physically embodied as a single transformer with separate windings for the input signals 123, 124 and for output signals 137, 138 but sharing the same magnetic core(s), or else they may be physically embodied as two physically separate transformers.

The transformer stage 130 provides signals 137, 138 to the output stage 140. Signal 137 from the secondary output of transformer 135 is provided to a first rectifier block 160 of the output stage 140. Signal 139 from the secondary output of transformer 136 is provided to a second rectifier block 161 of the output stage 140. Each of the rectifier blocks 160, 161 may be embodied as, e.g., a full-wave rectifier bridge. The rectified output signals 166, 167 of the rectifier blocks 160, 161 may be periodic waveforms that are complementary in nature such that, when summed together, the result is a constant DC level. To this end, rectified output signals 166, 167 are provided to a signal combiner 170, which sums the rectified output signals 166, 167 and provides a DC output signal 185 that is substantially constant in nature, generally without the need for storage/smoothing capacitors. In practice, small amounts of ripple may occur, which can be smoothed out with relatively small smoothing capacitor(s) (not shown) that may be provided in any convenient location, such as at the outputs of rectifier blocks 160, 161 and/or after the signal combiner 170.

Figure 2:
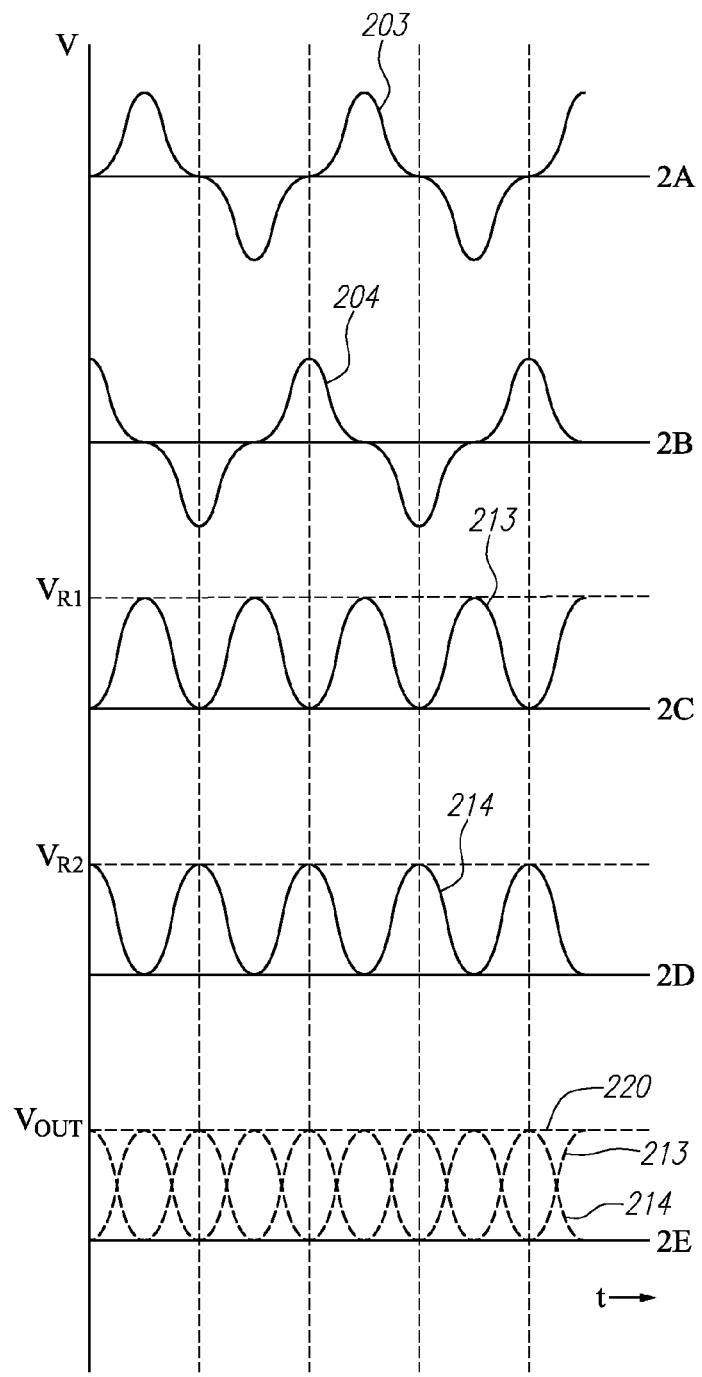
FIG. 2 is a set of waveform diagrams illustrating operation of the power supply shown in FIG. 1, in accordance with one example.

The characteristics of the generated waveforms $V_{IN1}$, $V_{IN2}$ are selected to be periodic waveforms so that, after the signals are transformed, rectified, and combined (e.g., added), the resulting output signal 185 is a constant DC level. Preferably, waveforms $V_{IN1}$, $V_{IN2}$ are identical in shape but offset from one another by 90 degrees. Also, the waveforms are preferably generally smooth, lacking lack spikes or other features that could be undesirable from an EMI perspective. Examples of suitable waveforms for signals $V_{IN1}$, $V_{IN2}$ are shown in FIG. 1, and also illustrated in greater detail in FIG. 2. In FIG. 2, graphs 2A and 2B show waveforms $V_{IN1}$ and $V_{IN2}$, respectively (represented as waveforms 203, 204 in FIG. 2), each of which constitutes an alternating non-inverted/inverted raised cosine waveform, but phase offset from one another by 90 degrees. After full-wave rectification, the resulting waveforms 213, 214 are illustrated in graphs 2C and 2D, which relate to waveforms $V_{IN1}$, $V_{IN2}$ respectively. Waveforms 213, 214 are sinusoidal waveforms offset from one another by 90 degrees, i.e., have the relationship of sine and cosine, reflecting the phase offset of original waveforms $V_{IN1}$, $V_{IN2}$. When added together, rectified waveforms 213, 214 result in an output waveform 220 having a constant DC output level, as shown in graph 2E. In other words, the rectification and summing of waveforms $V_{IN1}$, $V_{IN2}$ results in a constant DC output level, generally without the need for large storage/smoothing capacitors as would normally be required in conventional switching power supplies.

Figure 3:
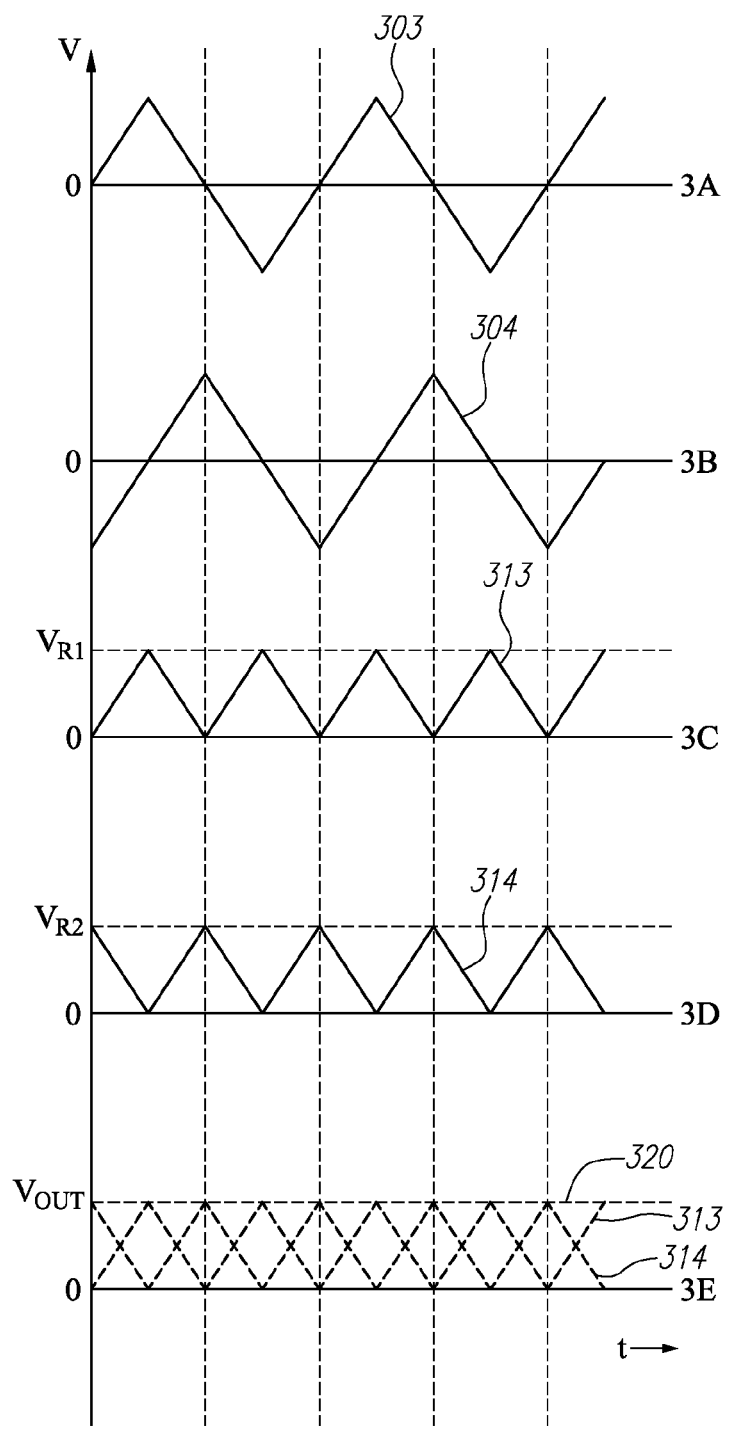
FIG. 3 is a set of waveform diagrams illustrating operation of the power supply shown in FIG. 1, in accordance with another example.

Besides the waveforms 203, 204 illustrated in graphs 2A and 2B of FIG. 2, other waveforms can also be used and provide a similar end result. FIG. 3 illustrates a second example of complementary periodic waveforms selected to provide a constant DC output level after rectification and summing. In FIG. 3, graphs 3A and 3B depict waveforms $V_{IN1}$ and $V_{IN2}$, respectively (represented as waveforms 303, 304 in FIG. 3), each of which constitutes a triangle waveform having alternating non-inverted/inverted triangular waves, but phase offset from one another by 90 degrees. After full-wave rectification, the resulting waveforms 313, 314 are shown in graphs 3C and 3D, which relate to waveforms $V_{IN1}$, $V_{IN2}$ respectively. Rectified waveforms 313, 314 are both positive triangle waveforms having symmetrical shape, offset from one another by 90 degrees, reflecting the phase offset of original waveforms $V_{IN1}$, $V_{IN2}$. When added together, rectified waveforms 313, 314 result in an output waveform 320 having a constant DC output level, as shown in graph 3E. Because rectified waveforms 313, 314 have the same linear slope for the rising and falling portions of the triangular waves, the fall in voltage of the first rectified waveform 313 matches the rise in voltage of the second rectified waveform 314, and vice versa. Thus, the rectification and summing of waveforms $V_{IN1}$, $V_{IN2}$ results in a constant DC output level, generally without the need for large storage/smoothing capacitors as would normally be required in conventional switching power supplies.

Besides the waveforms for $V_{IN1}$, $V_{IN2}$ shown in FIGS. 2 and 3, other waveforms can be used as well. Preferably, waveforms $V_{IN1}$, $V_{IN2}$ are selected or generated such that after transformation and full-wave rectification, the rectified waveforms are complementary to one another such that they can be added together to result in a constant DC level. Such waveforms may include periodic waveforms resulting in rectified waveforms that are symmetrical in nature, such that their rising slope and curvature are the same as their falling slope and curvature. Likewise, the rectified waveforms are preferably symmetrical about their midpoint, such that their alternating "positive" and "negative" waves are identical in shape but inverted from one another. The waveform examples shown in FIGS. 2 and 3 meet the above criteria. Where such rectified waveforms are identical but offset from one another by 90 degrees, the symmetrical nature of the rectified waveforms means that the rise in one rectified waveform will exactly match the fall in the other rectified waveform, thus leading to a constant combined output level.

In addition to the above, more complex waveforms can also be used for $V_{IN1}$, $V_{IN2}$. For example, the waveforms $V_{IN1}$, $V_{IN2}$ may be comprised of a number of different harmonics, and/or may vary over time.

The power conversion techniques described above may be applied to either voltage or current based power supplies. More detailed examples are described further herein.

Figure 4:
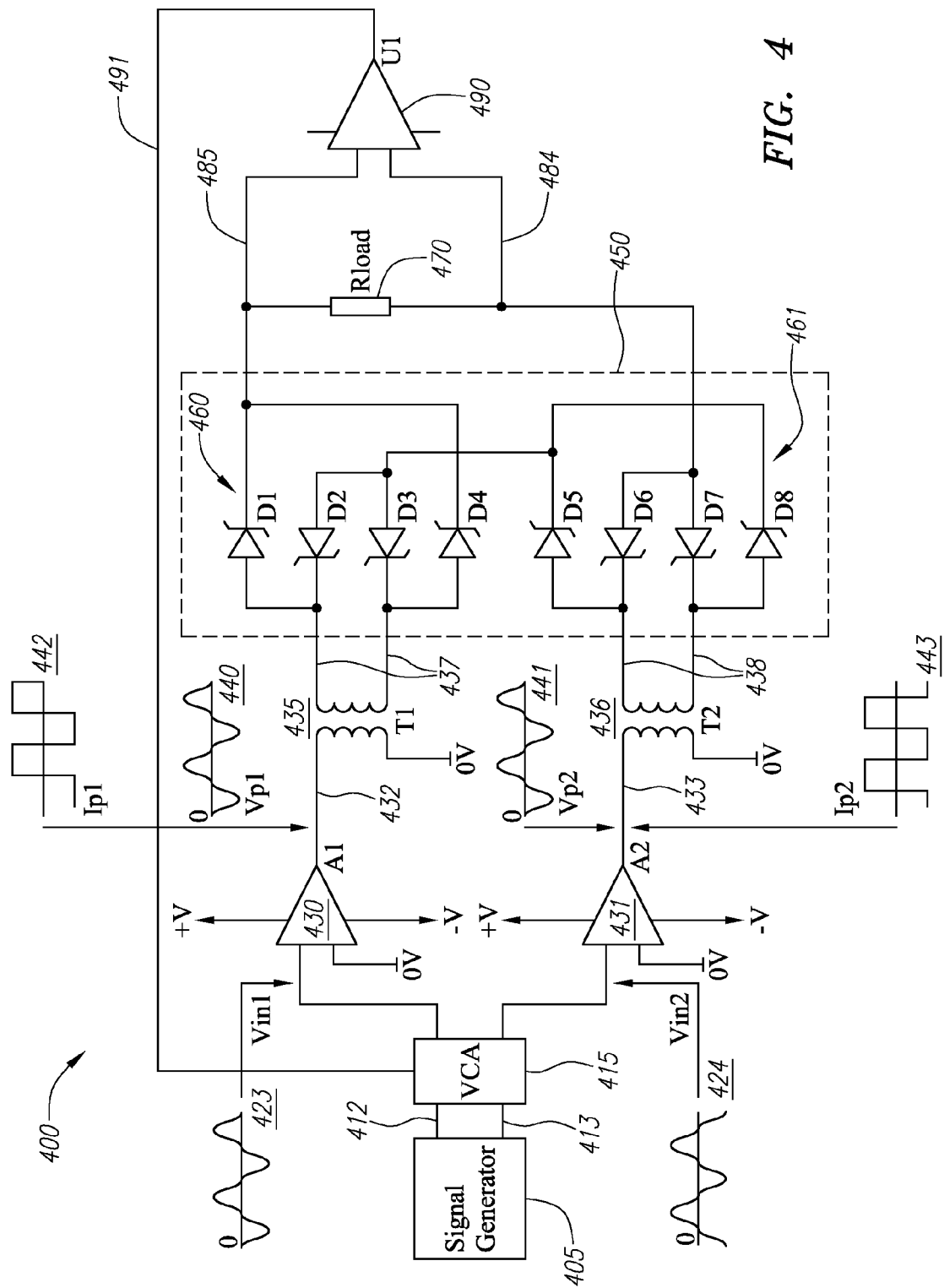
FIG. 4 is a block diagram showing components of an embodiment of a voltage-controlled DC output power supply as disclosed in accordance with the conceptual block diagram of FIG. 1.

FIG. 4 is a block diagram showing components of an embodiment of a voltage-controlled DC output power supply 400 as disclosed in accordance with the conceptual block diagram of FIG. 1. The power supply 400 may be supplied by a local power source such as a battery, or by an external power source such as a line source. In FIG. 4, a signal generator 405 generates a pair of complementary waveform signals 412, 413, preferably periodic in nature, and which generally have the characteristics previously described for $V_{IN1}$ and $V_{IN2}$—i.e., they are shaped or selected so as to provide a constant DC output after being coupled through a transformer stage, rectified and combined. The complementary waveform signals 412, 413 are provided to a voltage controlled amplifier (VCA) 415, which adjusts the amplitude of the waveforms signals 412, 413 based upon feedback received from the DC output signal 485 via feedback sense amplifier 490. In some embodiments, voltage controlled amplifier 415 may be omitted, as may feedback path 491 and sense amplifier 490.

The voltage controlled amplifier 415 outputs the amplitude-adjusted pair of complementary waveform signals $V_{IN1}$ and $V_{IN2}$ to linear amplifiers 430, 431, respectively, as reflected by waveforms 423, 424 in the overlay graphs shown in FIG. 4, depicting an example similar to the waveforms used in the like example of FIG. 1 and FIG. 2. The power inputs of linear amplifiers 430, 431 are connected to power supply rails +V and −V, and they output amplified signals 432, 433 that essentially span from rail to rail (subject to minor losses from the amplifiers 430, 431). The voltage characteristics of signals 432, 433 for one waveform example are reflected in overlay graphs 440 and 441 (depicting waveforms Vp1 and Vp2) respectively, illustrated in FIG. 4, in the case where the initial generated waveforms appear as in graphs 423, 424 for $V_{IN1}$ and $V_{IN2}$. The corresponding current characteristics of Vp1 and Vp2 are reflected in overlay graphs 442 and 443 (depicting waveforms Ip1 and Ip2) respectively. As can be seen from graphs 440, 441, 442 and 443, the voltage waveforms Vp1 and Vp2 for this particular example are characterized by alternating inverted and non-inverted raised cosine waves (with Vp1 and Vp2 being identical but offset from one another by 90 degrees), while the corresponding current waveforms Ip1 and Ip2 take the form of square waves having a constant positive current corresponding to the time period of the non-inverted raised cosine waves, and constant negative current corresponding to the time period of the inverted raised cosine waves. Like the voltage waveforms, the current waveforms Ip1 and Ip2 are identical but offset from one another by 90 degrees.

The output of the first linear amplifier 430 is coupled to the primary winding of a first transformer 435. The output of the second linear amplifier 431 is coupled to the primary winding of a second transformer 436. The secondary windings of transformers 435, 436 are coupled to an output stage 450, which receives the transformer output signals 437, 438 from the transformers 435, 436. The transformers 435, 436 may be step-up or step-down in nature, and are preferably identical in characteristics, assuming that the amplitude of the complementary waveform signals Vp1 and Vp2 is the same. Transformers 435, 436 may be physically embodied as a single transformer with separate windings for the input signals 432, 433 and for the output signals 437, 438, but sharing the same magnetic core(s), or else they may be physically embodied as two separate transformers. Transformers 435, 436 are preferably designed to have low leakage inductance.

The output stage 450 preferably comprises a pair of rectifier blocks 460, 461 that may be embodied as, e.g., full-wave rectifier bridges. Signal 437 from the secondary output of transformer 435 is provided to a first rectifier block 460 of the output stage 450. Signal 439 from the secondary output of transformer 436 is provided to a second rectifier block 461 of the output stage 450. Each of the rectifier blocks 460, 461 may be embodied as, e.g., a full-wave rectifier bridge. The rectified output signals of the rectifier blocks 460, 461 are, in this case, periodic waveforms that are complementary in nature such that, when summed together, the result is a constant DC level. To this end, the outputs of rectifier blocks 460, 461 are tied together in series so that the rectified output signals therefrom are additively combined, thereby providing a DC output signal 485 that is substantially constant in nature, generally without the need for storage/smoothing capacitors. In practice, small amounts of ripple may occur, which can be smoothed out with relatively small smoothing capacitor(s) (not shown) that may be provided in any convenient location, such as at the outputs of rectifier blocks 460, 461 and/or across the load 470. The load 470 is thus supplied with a constant DC output supply signal.

If desired, feedback may be provided via sense amplifier 490, which samples the DC output signal 485 and provides a voltage feedback signal to voltage-controlled amplifier 415, which in turn adjusts the amplitude of input waveforms 412, 413 so as to be suitable for the linear amplifiers 430, 431. In this manner, the DC output signal 485 may be maintained at a constant voltage level.

Operation of the power supply 400 is generally similar to the power supply 100 of FIG. 1. For example, where the input waveforms 412, 413 take the shape of periodic alternating inverted/non-inverted raised cosine waves such as illustrated in graphs 2A and 2B of FIG. 2, the resulting rectified and combined waveforms will be similar to those shown in graphs 2C, 2D and 2E of FIG. 2, as previously explained. Where the input waveforms 412, 413 take the shape of triangular waveforms with alternating inverted/non-inverted triangle waves such as illustrated in graphs 3A and 3B of FIG. 3, the resulting rectified and combined waveforms will be similar to those shown in graphs 3C, 3D and 3E of FIG. 3, as also previously explained. As with FIG. 1, any suitable periodic waveforms may be used, including waveforms with multiple harmonics or which alternate over time. With suitable waveforms as described herein, the power supply 400 may result in a constant DC output signal 485 theoretically requiring no storage/smoothing capacitors.

Figure 5:
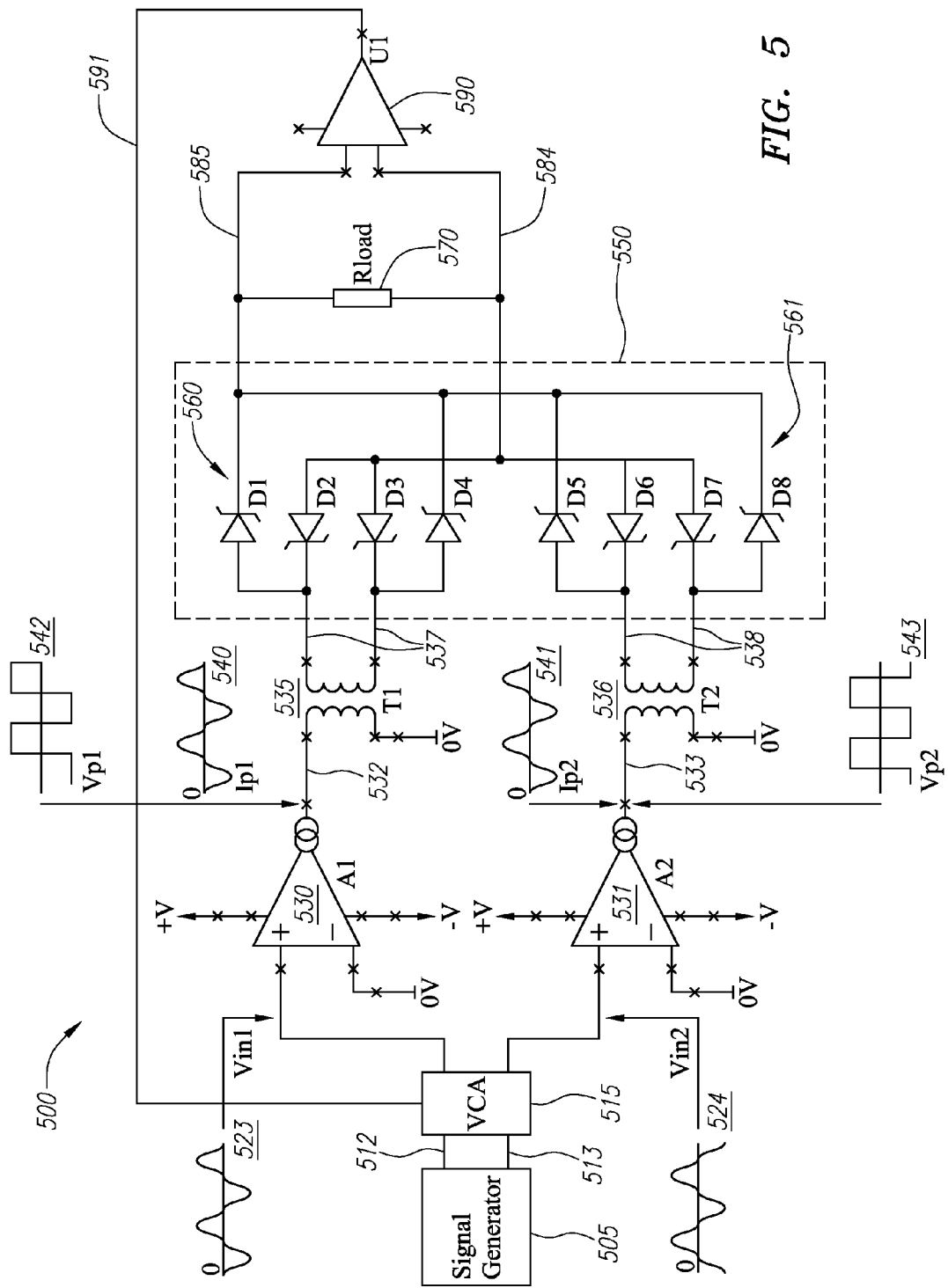
FIG. 5 is a block diagram showing components of an embodiment of a current-controlled DC output power supply as disclosed in accordance with the conceptual block diagram of FIG. 1.

FIG. 5 is a block diagram showing components of another embodiment of a power supply 500 in accordance with the general approach of FIG. 1. Unlike the power supply of FIG. 4, which is a voltage-controlled DC output power supply, FIG. 5 illustrates a current-controlled DC output power supply 500. In FIG. 5, elements labeled 5xx are generally analogous in function to the similarly labeled elements 4xx in FIG. 4. The power supply 500 may, as before, be supplied by a local power source such as a battery, or by an external power source such as a line source. A signal generator 505 generates a pair of complementary waveform signals 512, 513, preferably periodic in nature, and which generally have the characteristics previously described for $V_{IN1}$ and $V_{IN2}$—that is, they are shaped or selected so as to provide a constant DC output after being coupled through a transformer stage, rectified and combined. The complementary waveform signals 512, 513 are provided to a voltage controlled amplifier (VCA) 515, which adjusts the amplitude of the waveforms signals 512, 513 based upon feedback received from the DC output signal 585 via feedback sense amplifier 590. In some embodiments, voltage controlled amplifier 515 may be omitted, as may feedback path 591 and sense amplifier 590.

The voltage controlled amplifier 515 outputs the amplitude-adjusted pair of complementary waveform signals $V_{IN1}$ and $V_{IN2}$ to linear transconductance amplifiers 530, 531, respectively, as reflected by waveforms 523, 524 in the overlay graphs shown in FIG. 5, depicting an example similar to the waveforms used in the like example of FIG. 1 and FIG. 2. Transconductance amplifiers 530, 531 output a current proportional to their input voltage, and thus may be viewed as voltage-controlled current sources. The effect of transconductance amplifiers 530, 531 is that the waveforms 512, 513 generated by the signal generator 505 will be essentially converted to current waveforms of similar shape. As discussed below, this may have advantages for downstream processing and may result in even better EMI characteristics. The transconductance amplifiers 530, 531 are connected to power supply rails +V and −V, and output amplified signals 532, 533 to transformers 535, 536. The current characteristics for signals 532, 533 are reflected in overlay graphs 540 and 541 (depicting waveforms Ip1 and Ip2) respectively, illustrated in FIG. 5, in the case where the initial generated waveforms appear as in graphs 523, 524 for $V_{IN1}$ and $V_{IN2}$. The corresponding voltage characteristics of signals 532, 533 are reflected in overlay graphs 542 and 543 (depicting waveforms Vp1 and Vp2) respectively. As can be seen from graphs 540, 541, 542 and 543, the current waveforms Ip1 and Ip2 for this particular example are characterized by alternating inverted and non-inverted raised cosine waves (with Ip1 and Ip2 being identical but offset from one another by 90 degrees), while the corresponding voltage waveforms Vp1 and Vp2 take the form of square waves having a constant positive voltage corresponding to the time period of the non-inverted raised cosine waves, and constant negative voltage corresponding to the time period of the inverted raised cosine waves. Like the current waveforms Ip1 and Ip2, the voltage waveforms Vp1 and Vp2 are identical but offset from one another by 90 degrees.

The output of the first transconductance amplifier 530 is coupled to the primary winding of a first transformer 535. The output of the second transconductance amplifier 531 is coupled to the primary winding of a second transformer 536. The secondary windings of transformers 535, 536 are coupled to an output stage 550, which receives the transformer output signals 537, 538 from the transformers 535, 536. The transformers 535, 536 may be step-up or step-down in nature, and are preferably identical in characteristics, assuming that the amplitude of the incoming signals 532, 533 is the same. Transformers 535, 536 may be physically embodied as a single transformer with separate windings for the input signals 532, 533 and for the output signals 537, 538, but sharing the same magnetic core(s), or else they may be physically embodied as two separate transformers.

The output stage 550 preferably comprises a pair of rectifier blocks 560, 561 that may be embodied as, e.g., full-wave rectifier bridges. Signal 537 from the secondary output of transformer 535 is provided to a first rectifier block 560 of the output stage 550. Signal 538 from the secondary output of transformer 536 is provided to a second rectifier block 561 of the output stage 550. Each of the rectifier blocks 560, 561 may be embodied as, e.g., a full-wave rectifier bridge. The rectified output signals of the rectifier blocks 560, 561 are, in this case, periodic waveforms that are complementary in nature such that, when summed together, the result is a constant DC level. To this end, the outputs of rectifier blocks 560, 561 are tied in parallel together so that the rectified output signals therefrom are additively combined, thereby providing a DC output signal 585 that is substantially constant in nature, generally without the need for storage/smoothing capacitors. In practice, small amounts of ripple may occur, which can be smoothed out with relatively small smoothing capacitor(s) (not shown) that may be provided in any convenient location, such as at the outputs of rectifier blocks 560, 561 and/or across the load 570. The load 570 is thus supplied with a constant DC output supply signal.

If desired, feedback may be provided via sense amplifier 590, which samples the DC output signal 585 and provides a voltage feedback signal to voltage-controlled amplifier 515, which in turn adjusts the amplitude of input waveforms 512, 513 so as to be a suitable level for the transconductance amplifiers 530, 531. In this manner, the DC output signal 585 may be maintained at a constant voltage level. The feedback loop is preferably designed so that transconductance amplifiers 530, 531 operate close to the rails for maximum efficiency, but far enough so that the amplifiers remain in the linear region of operation and do not clip. The voltage feedback loop is helpful to ensuring that the voltage level remains relatively constant even if the characteristics of the load (e.g., its resistance) fluctuates over time. Voltage feedback can also be used to ensure that, if the input voltage drops (for instance, with a battery as the input source), then the output voltage will remain relatively constant.

Operation of the power supply 500 is generally similar to the power supply 100 of FIG. 1, treating the output signals 123, 124 of waveform generator 105 as relating to current. Where the input waveforms 512, 513 take the shape of periodic alternating inverted/non-inverted raised cosine waves such as illustrated in graphs 2A and 2B of FIG. 2, the resulting rectified and combined waveforms will be similar to those shown in graphs 2C, 2D and 2E of FIG. 2, as previously explained. Where the input waveforms 512, 513 take the shape of triangular waveforms with alternating inverted/non-inverted triangle waves such as illustrated in graphs 3A and 3B of FIG. 3, the resulting rectified and combined waveforms will be similar to those shown in graphs 3C, 3D and 3E of FIG. 3, as also previously explained. As with FIG. 1, any suitable periodic waveforms may be used, including waveforms with multiple harmonics or which alternate over time. With suitable waveforms as described herein, the power supply 500 may result in a constant DC output signal 585 theoretically requiring no storage/ smoothing capacitors.

Figure 11A:
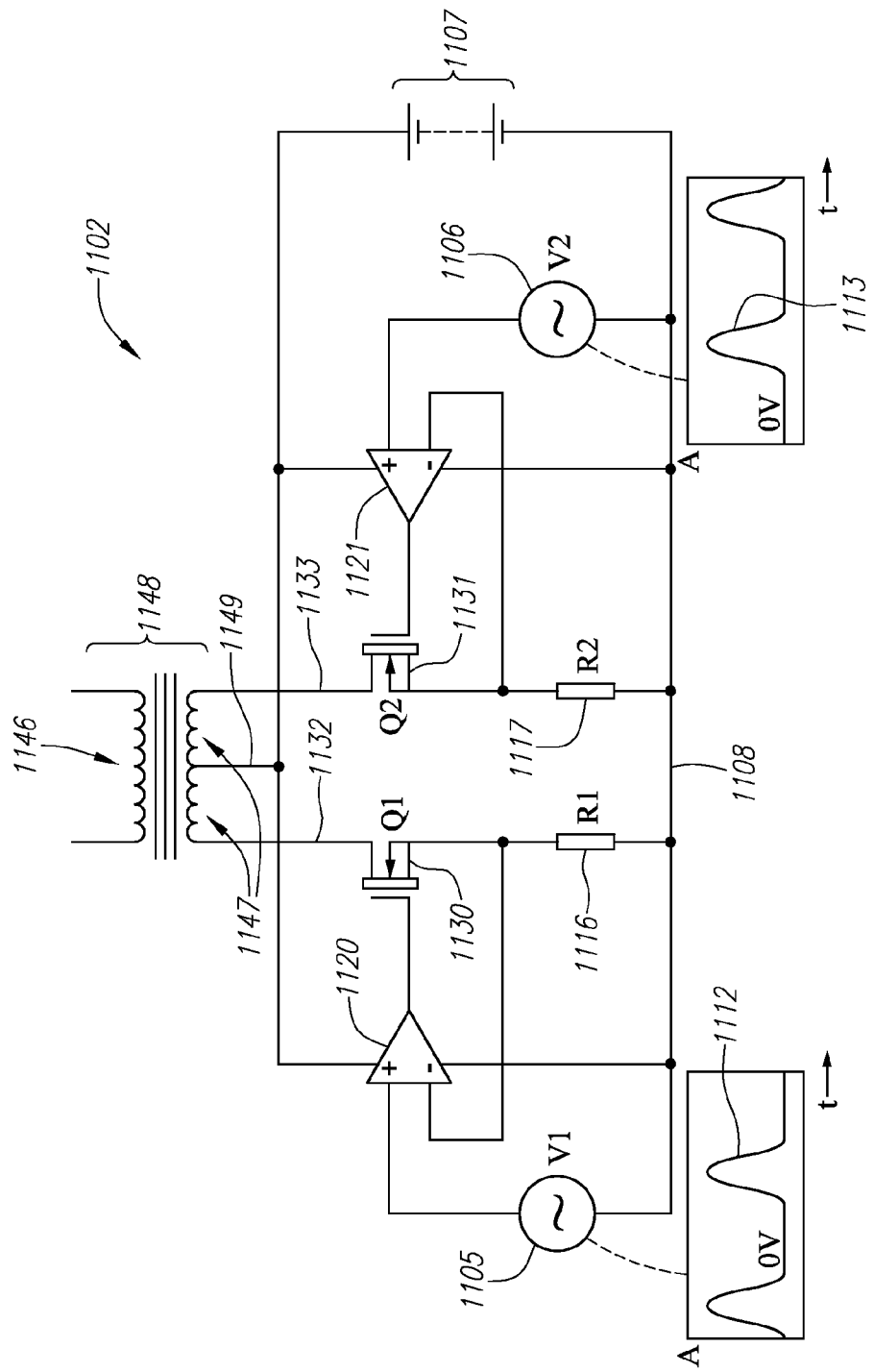
FIGS. 11A and 11B are schematic diagrams of a portion of a DC power supply operating in accordance with the principles of FIG. 1, using different input waveforms in each case.
Figure 11B:
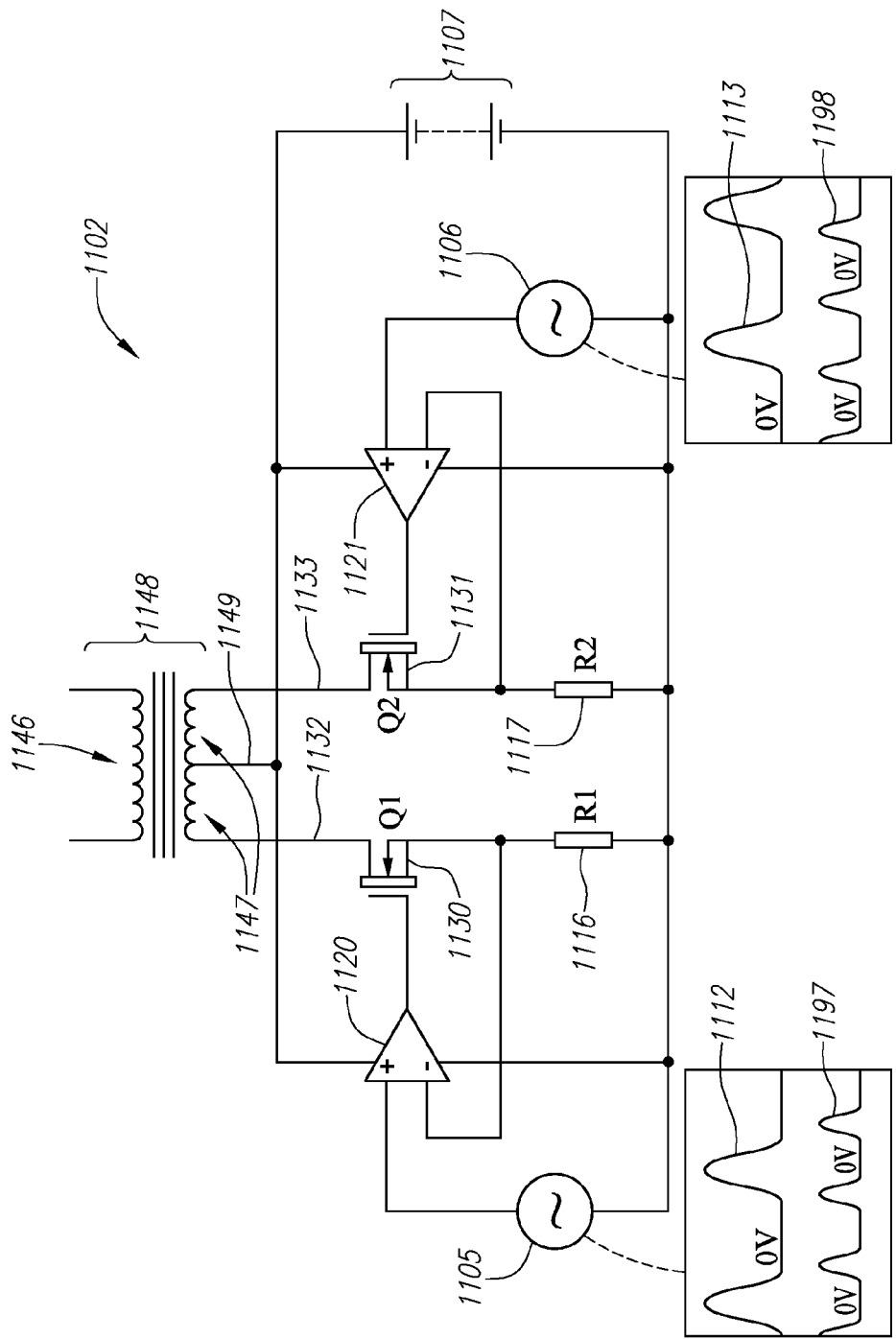

Another embodiment of a power supply, using an alternative amplifier arrangement, is shown in FIGS. 11A and 11B. In these examples, only half of the primary side power supply is shown, for purposes of simplicity; the circuitry in each case would be duplicated to complete the primary side portion of the power supply. Thus, the transformer 1148 shown in FIG. 11A would correspond conceptually to transformer 135 (T1) in FIG. 1, while a second set of circuitry and second transformer corresponding to transformer 136 (T2) would be utilized to complete the primary side portion of the power supply. Likewise, because only the power supply circuitry 1102 on the primary side is depicted in FIGS. 11A and 11B, the circuitry on the secondary side would generally be formed of half the bridge circuitry as shown, for example, in FIG. 1 as rectifier 160 (R1) or in FIG. 5 (i.e., diodes D1-D4 of output stage 550).

The general approach in FIGS. 11A and 11B is to employ a push-pull amplifier design; hence, transformer 1148 has a single secondary winding 1146 but two primary windings 1147.

Looking first at the example of FIG. 11A, voltage sources 1105, 1106 generate output waveforms 1112 and 1113, respectively, depicted in the accompanying superposed graphs proximate the voltage sources 1105, 1106. Waveforms 1112 and 1113 generally equate to the positive and negative half-cycles, respectively, of the periodic waveform shown in FIG. 2A. The first voltage source 1105 generates a waveform 1112 corresponding to the non-inverted raised cosine waves in FIG. 2A, while the second voltage source 1106 generates a waveform corresponding the inverted raised cosine waves in FIG. 2A; but these waves are shown as positive instead of negative because they are applied to the inverted side of the dual-primary transformer 1148. For the second transformer (not shown) generating the complementary waveform, two similar voltage sources would be provided to generate waveforms corresponding to the positive and negative half-cycles, respectively, of the periodic waveform shown in FIG. 2B, and are similarly phase-offset from the waveforms of voltage generators 1105, 1106 just like the waveforms of FIGS. 2A and 2B.

Each of waveforms 1112, 1113 constitutes a series of non-inverted raised cosine waves, which in this example are phase offset from one another by 180 degrees. Voltage sources 1105, 1106 are provided as inputs to linear amplifiers 1120, 1121 respectively, which in turn feed field-effect transistors (FETs) 1130, 1131. Each of the transistors 1130, 1131 is connected to one of the primary windings 1147 of the transformer 1148, and the source of each is also connected to the non-inverting input of the respective signal amplifier 1120, 1121 and to respective current sense resistors 1116 and 1117. Also, the centertap 1149 of the transformer 1149 and power supply inputs of amplifiers 1120, 1121 are connected to a separate power supply 1107, which may comprise, e.g., a series of batteries or other DC power source.

Amplifier 1120 and transistor 1130 (Q1) along with amplifier 1121 and transistor 1131 (Q2) together form a push-pull amplifier providing a defined current output defined by the voltage waveforms 1112, 1113 applied by sources 1105 and 1106. The current waveforms are fed to transformer 1149, and then appear on the secondary winding 1146 for rectification by the output stage (not shown in FIG. 11A).

In some configurations, the device of FIG. 11A may provide an advantage in that single-polarity power transistor devices can be utilized, and the drive voltages can be unipolar and ground-referenced.

For optimal performance, the transistors 1130, 1131 might be configured according to conventional methods to conduct a permanent quiescent current in order to improve linearity and speed of response at lower output current levels. However, such a quiescent current may decrease the overall efficiency of the power supply. The slightly modified operational arrangement shown in FIG. 11B may reduce the amount of quiescent current. The basic structure of FIG. 11B is similar to FIG. 11A, but the waveforms supplied by the signal generators 1105, 1106 are modified to improve linearity and speed of response at low output current levels while minimizing any decrease in overall efficiency. The additional periodic waveforms 1197, 1198 shown beneath the main driving waveforms 1112, 1113 are amplitude-magnified views in each case of a common-mode waveform added to both halves of the push-pull amplifier simultaneously. This common-mode waveform causes the transistors 1130, 1131 to conduct quiescent current only around the region where the respective main waveform 1112, 1113 approaches zero; at all other periods outside of the conduction period the transistors 1130, 1131 are biased OFF. The common-mode current causes the transistors 1130, 1131 to enter their conduction region shortly in advance of when they are required to operate, thus reducing turn-on distortion. The common mode current in each half of the output stage (on the secondary side) cancels out in the transformer 1148 and so does not appear in the output from the transformer secondary windings 1146.

The period during which the common mode waveform causes the transistors 1130, 1131 to conduct can be varied from the example shown. In this manner, the average power loss due to the quiescent current can be significantly reduced compared to the continuous conduction case.

The power amplifier arrangements depicted in FIG. 5 and FIGS. 11A and 11B generally may be characterized as linear transconductance amplifiers with a nominally flat frequency response, such that they accurately reproduce the complementary waveforms fed to their inputs. The complementary waveforms are non-sinusoidal and so typically require a high gain-bandwidth product from the amplifiers for optimum performance.

In the case of the particular complementary waveforms shown in FIGS. 2A and 2B, this constraint can be relaxed by appropriate modification of the complementary waveforms such that the amplifiers may be configured as integrators. The closed loop response of an integrator generally falls at 6 dB/octave with increasing frequency, allowing an amplifier with a lower open-loop bandwidth to be employed.

Figure 12:
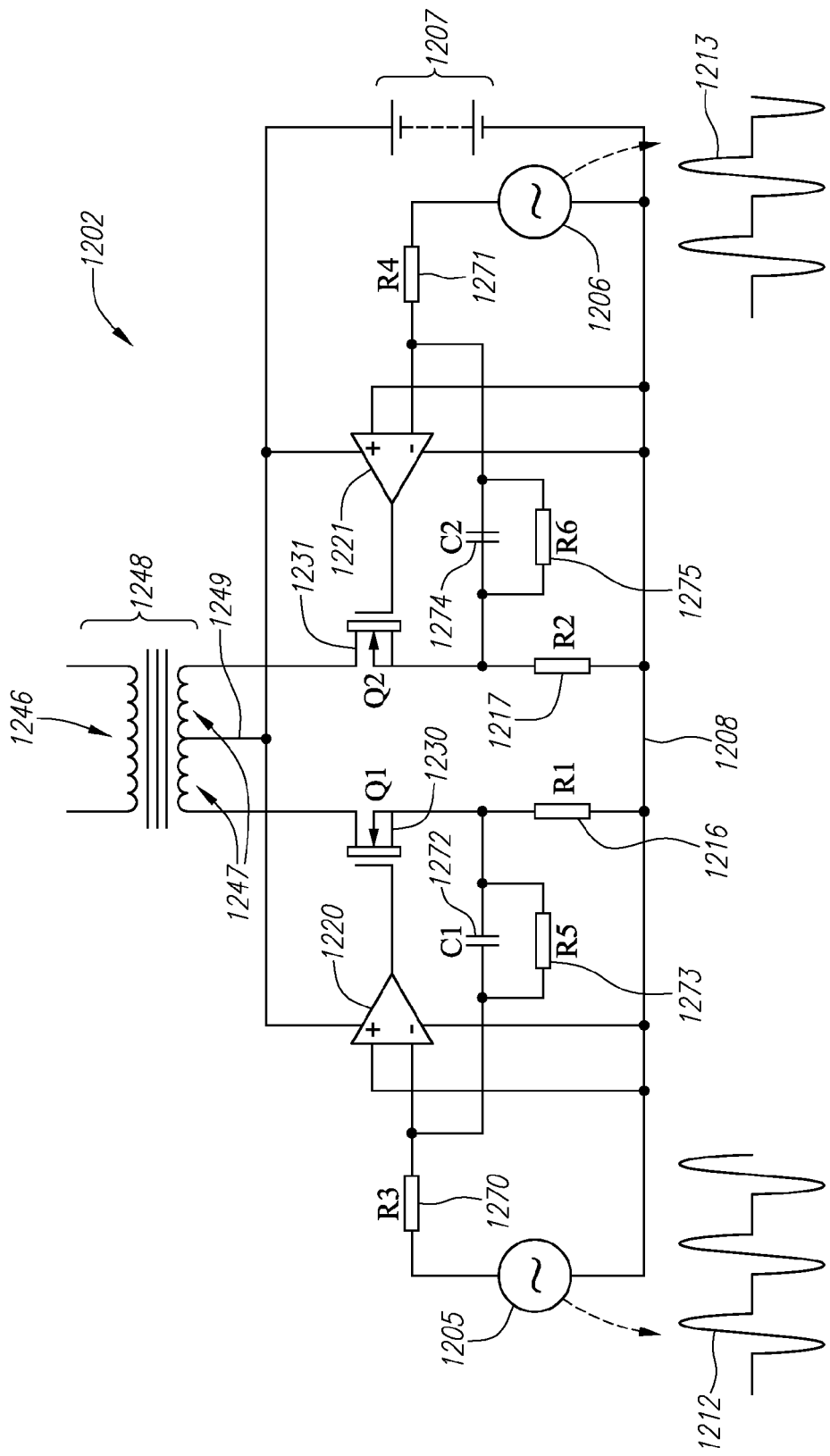
FIG. 12 is a schematic diagram of a portion of a DC power supply having amplifiers configured as integrators.

One example of an amplifier configuration that may be used with this approach is shown in FIG. 12. In this embodiment, as with the design in FIGS. 11A and 11B, only half of the primary side power supply is illustrated corresponding to the circuitry associated with one of two transformers. As with the earlier designs, the transformer 1248 in this example has a single secondary winding 1246 but two primary windings 1247. As before, only the power supply circuitry 1202 on the primary side is depicted, while the circuitry on the secondary side for this half of the primary side circuitry would generally comprise bridge circuitry similar to that of half the output stage of FIG. 1 or FIG. 5, for instance. In this example, a pair of voltage sources 1205, 1206 generate output waveforms 1212 and 1213, respectively, depicted in the accompanying graphs proximate the voltage sources 1205, 1206. The outputs of voltage sources 1205, 1206 are provided to linear amplifiers 1220, 1221 respectively, via resistors 1270 (R3) and 1271 (R4), while amplifiers 1220, 1221 in turn feed field-effect transistors (FETs) 1230, 1231. Each of the transistors 1230, 1231 is connected to one of the primary windings 1247 of the transformer 1248, and the source of each is also connected respectively to current sense resistors 1216 and 1217 and to respective integrating capacitors 1272 (C1) and 1274 (C2), each of which is straddled by a resistor 1273 (R5) and 1275 (R6) respectively. The centertap 1249 of the transformer 1249 and power supply inputs of amplifiers 1220, 1221 are connected to a separate power supply 1207, which may comprise, e.g., a series of batteries or other DC power source.

In operation, feedback from the current sensing resistors 1216 (R1) and 1217 (R2) is accomplished by means of capacitors 1272 (C1) and 1273 (C2), with resistors 1273 (R5) and 1274 (R6) included to provide DC stability. The integrator action of capacitors 1272 and 1273 forces the voltage across resistors 1216 (R1) and 1217 (R2) and hence the current through transistors 1230 (Q1) and 1231 (Q2) to be the integral of the voltages output by signal generators 1205 and 1206, i.e., of voltages 1212 and 1213. In order for that current to match the desired shape, the voltage waveforms 1212 and 1213 are selected to be the differentials of waveform 203 depicted in FIG. 2A (or waveform 204 for the complementary section of the primary side power supply circuitry), again (similar to FIG. 11A) only taking every other half-cycle from waveform 203 for waveform 1212 and for waveform 1213. Because waveform 1213 is applied to the negative winding of the dual-primary transformer 1248, the waves are shown as positive in nature.

An alternative integrator configuration may be constructed by dispensing with capacitors 1273 and 1274 (C1 and C2) and replacing current sensing resistors 1216 and 1217 (R1 and R2) with inductors. The current through the inductors in this case would be the integral of the voltage across them.

Figure 13:
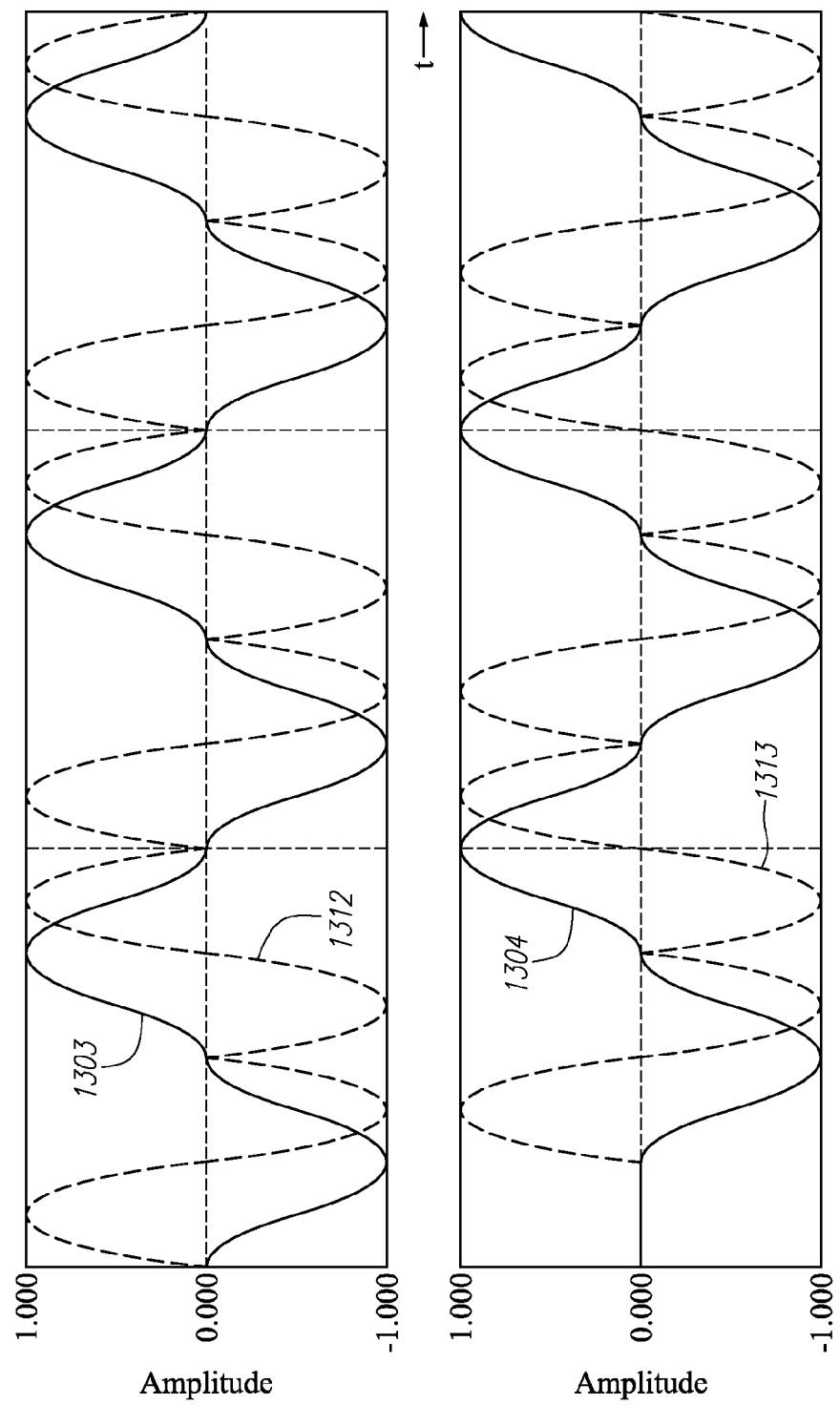
FIG. 13 is a diagram of waveforms as may be used in connection with a DC power supply having transconductance amplifiers with an integrator characteristic.

The use of an integrator for the power amplifier sections is not restricted to these particular examples. In the more generalized version of the power supply circuit of FIG. 5, amplifiers 530 and 531 may be configured as transconductance amplifiers with an integrator characteristic, fed with modified voltage waveforms in place of waveforms 523 and 524 shown in FIG. 5. The modified waveforms for this purpose are shown as waveforms 1312, 1313 in FIG. 13, while the solid lines show the waveforms 1303, 1304 resulting after integration. The modified waveforms 1312, 1313 may be described as a sequence of sine or cosine waves, with the sine or cosine waveform being inverted at the end of each cycle. As with FIGS. 2A and 2B, the waveforms 1312, 1313 and the resulting integrated waveforms 1303, 1304 are identical in shape but phase offset from one another.

Figure 14:
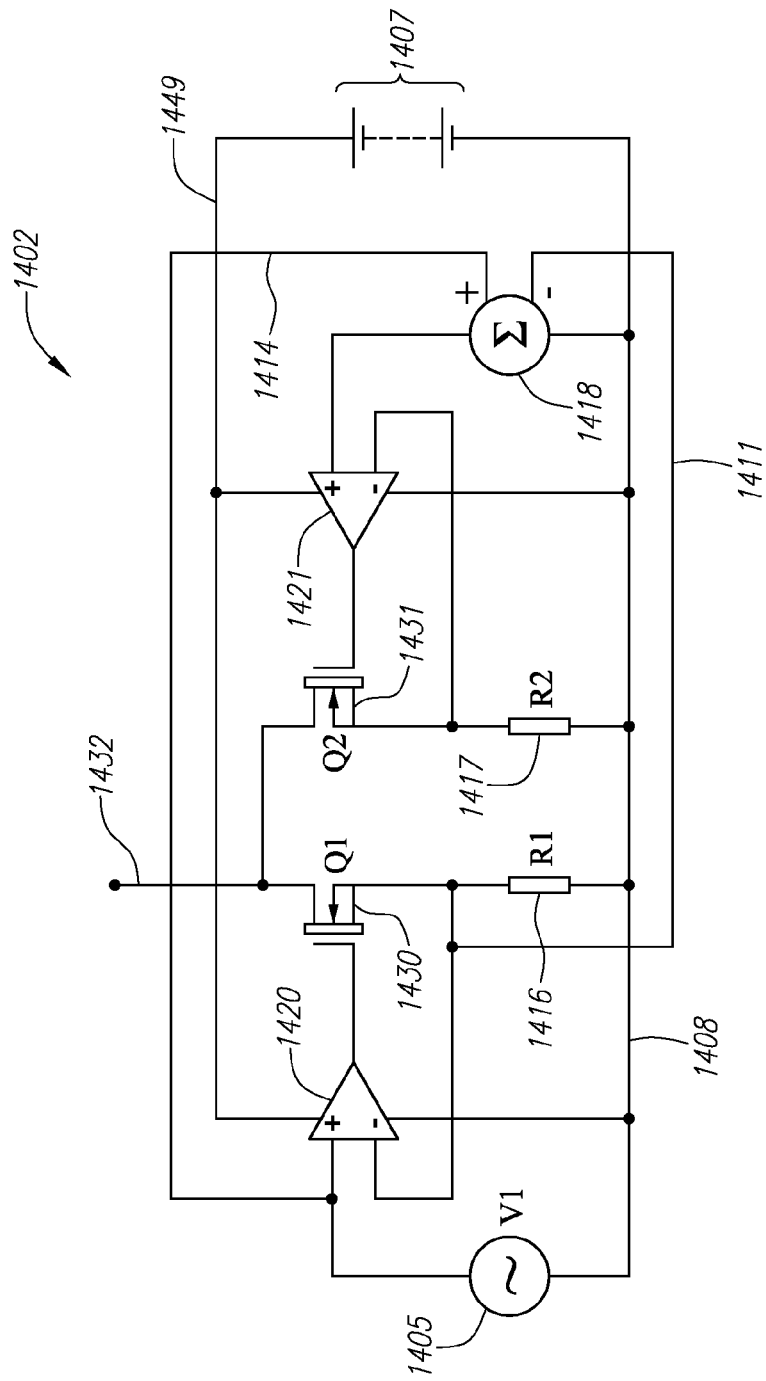
FIG. 14 is a schematic diagram of a portion of a DC power supply employing feedforward techniques to linearize the power amplifiers.

The goal of low quiescent power drain could also be fulfilled in other ways, for example by employing feedforward techniques to linearize the power amplifiers. This approach is illustrated in FIG. 14. For simplicity, the circuitry 1402 shown in FIG. 14 corresponds to one side of the power amplifier of FIG. 11A; a second set of similar components would be provided corresponding to the other half of the power amplifier of FIG. 11A in order to make a complete amplifier; and then, in turn, the entire set of circuitry would again be duplicated to provide the complementary signal for rectification and combination on the other side of the power supply. In FIG. 14, amplifier 1420, transistor 1430 (Q1) and resistor 1416 (R1) form an amplifier A1 which performs as in FIG. 11A, but with low to zero quiescent current. The output 1432 of transistor 1430 (Q1) is connected to one of the primary windings of a dual-primary transformer (similar to transformer 1148 shown in FIG. 11A). A DC power source 1407 supplies power to amplifiers 1420 and 1421, and is also connected to a center tap of the transformer (similar to the DC source signal connected to the centertap of transformer 1148 of FIG. 11A).

Amplifier 1421, transistor 1431 (Q2) and resistor 1417 (R2) form a low power error correction amplifier A2 which amplifies and scales the difference between the input voltage to A1 (output from signal generator 1405) and the output voltage across resistor 1416 (R1). A scaled version of this difference voltage is converted to a current through transistor 1431 (Q2) to add to the current from transistor 1430 (Q1). This is accomplished in part using differencer 1418, which receives the voltage signal from voltage source 1405 (V1) and subtracts the voltage signal at the node between the source of transistor 1430 (Q1) and the sense resistor 1416 (R1). Amplifier A2 therefore adds a correction current to the output that compensates for errors in A1. The correction current required from amplifier A2 is generally considerably smaller than the current output from amplifier A1, and therefore amplifier A2 can be a lower power amplifier than amplifier A1 and can also have a much smaller quiescent power dissipation.

The output 1432 of transistor pair 1430, 1431 may be fed to one of the primary windings of a transformer, similar to FIG. 11A. Another similarly configured feedforward amplifier, would be connected to the other primary winding of the transformer, as in FIG. 11A. The signal generators (1405 and its counterpart) may be configured to generate signals similar to FIG. 11A or other embodiments as disclosed herein.

Figure 15:
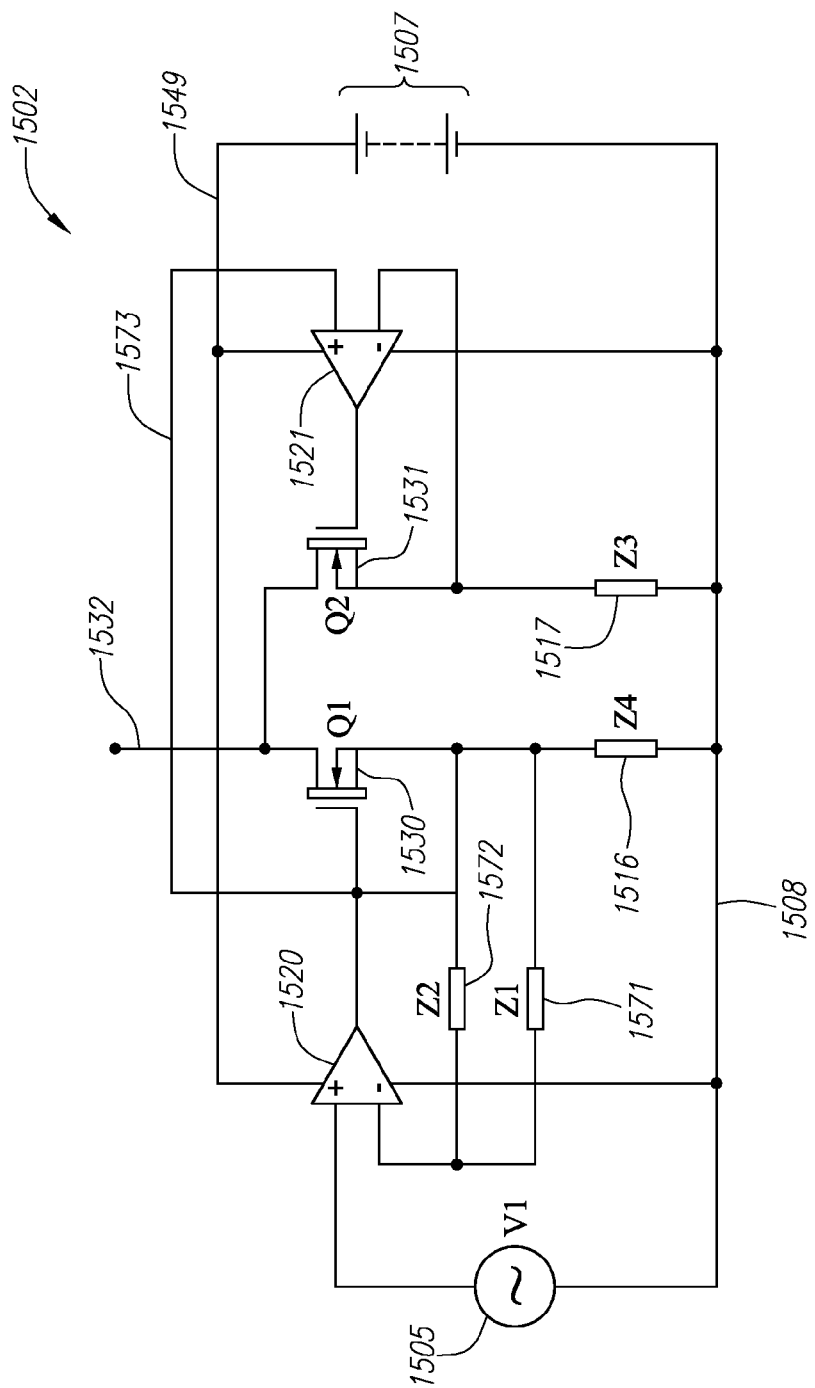
FIG. 15 is a schematic diagram of a portion of a DC power supply employing both feedforward and feedback techniques.

An alternative to using feedforward correction as illustrated in FIG. 14 is to apply both feedforward and feedback techniques as in the arrangement shown in the embodiment of FIG. 15. As with FIG. 14, the circuitry 1502 in FIG. 15 corresponds to one side of the power amplifier of FIG. 11A; a second set of similar components would correspond to the other half of the power amplifier of FIG. 11A in order to make a complete amplifier; and then, in turn, the entire set of circuitry would again be duplicated to provide the complementary signal for rectification and combination on the other side of the power supply. In FIG. 15, amplifier 1520, transistor 1530 (Q1) and impedance element 1516 (Z4) form an amplifier A1 which performs as in FIG. 11A, but with low to zero quiescent current. Amplifier 1521, transistor 1531 (Q2) and impedance element 1517 (Z3) form a low power correction amplifier. Another impedance element 1572 (Z2) forms a feedback path from the output of amplifier 1520 to its inverting input, and impedance element 1571 (Z1) connects the inverting input of amplifier 1520 to the node between transistor 1530 (Q1) and impedance element 1516 (Z4). If the relationship $Z2 \cdot Z4 = Z1 \cdot Z3$ is satisfied, then distortion in transistor 1530 (Q1) may be cancelled from the output current formed by the sum of the currents through transistors 1530 (Q1) and 1531 (Q2). Thus, amplifier stage A1 can be operated at low to zero quiescent current for maximum efficiency.

Furthermore, if impedance element 1572 (Z2) is chosen as a capacitor, impedance element 1516 (Z4) chosen to be an inductor, and impedance elements 1571 (Z1) and 1517 (Z3) are resistors, then the balance equation can be satisfied whilst the output current is the integral of the input voltage V1 from signal generator 1505, allowing the waveforms shown in FIG. 12 to be used.

Other combinations of impedance elements Z1-Z4 may also be used to achieve similar results, and the impedance elements need not be unitary circuit elements but may be networks of elements. For instance, impedance element 1572 (Z2) may be a capacitor, impedance element 1571 (Z1) a series combination of resistor and capacitor, impedance element 1516 (Z4) a resistor, and impedance element 1517 (Z3) a parallel combination of resistor and capacitor. This could also use the waveforms shown in FIG. 12 as inputs. As another example, impedance element 1572 (Z2) may be a capacitor, impedance element 1571 (Z1) a resistor, impedance element 1516 (Z4) may also be a resistor, and impedance element 1517 (Z3) may be a capacitor. In this case, the device could use the input waveforms shown in FIG. 11A, or other suitable waveforms.

Figure 16:
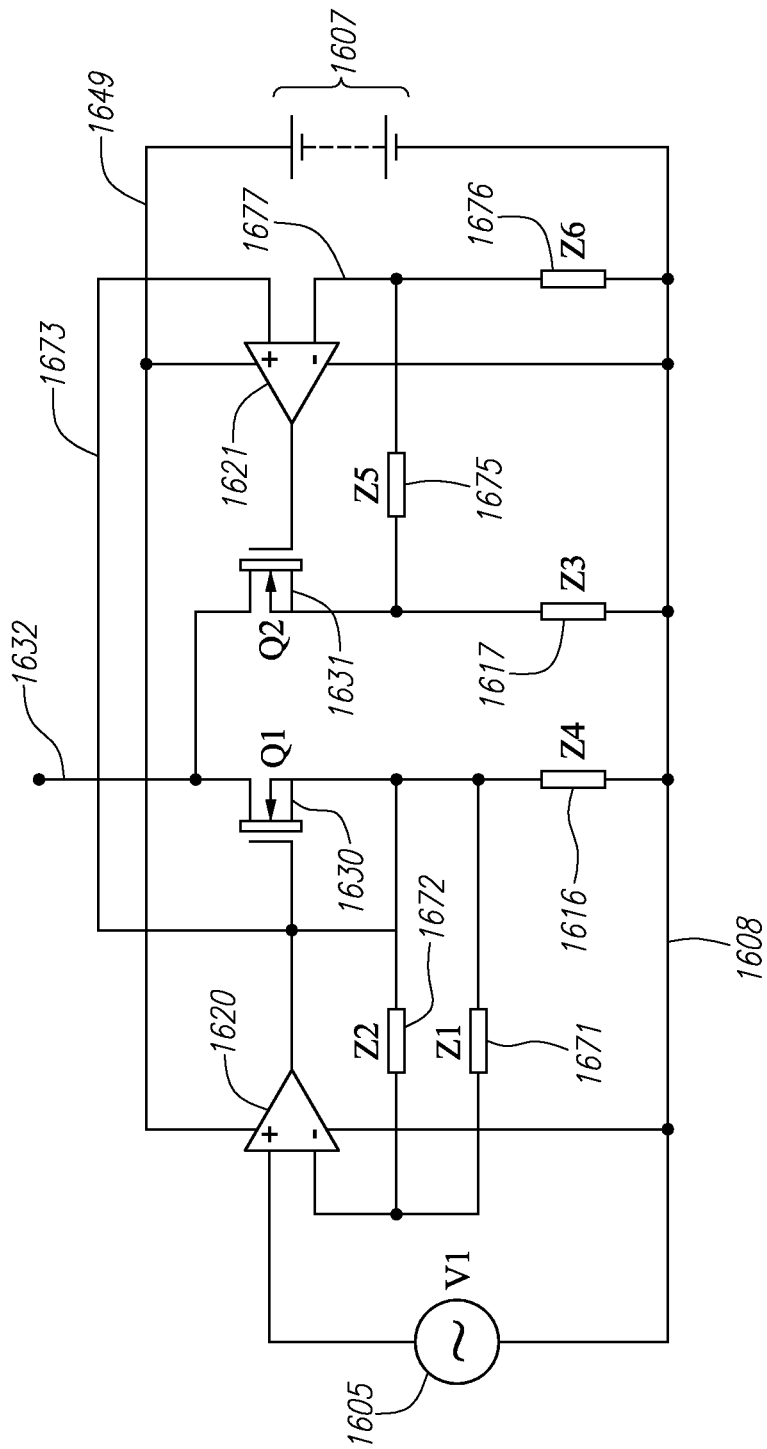
FIG. 16 is a schematic diagram of another embodiment of a DC power supply employing both feedforward and feedback techniques.

A further alternative is to combine an impedance element for Z3 with a filter on the input to the non-inverting input terminal of amplifier 1521. The transfer function of the correction amplifier A2 could also be altered by the addition of feedback elements 1675 (Z5) and 1676 (Z6) as shown in FIG. 16. For example, impedance element 1675 (Z5) may be a resistor, and impedance element 1676 (Z6) may be a capacitor. The transfer function of amplifier A2 may be modified to make impedance element 1617 (Z3) appear like a different type of impedance element; for example, it may be desired to implement impedance element 1617 (Z3) as a resistor, thus avoiding use of a reactive element as impedance element 1617. In other respects, FIG. 16 is identical to FIG. 15, and components 16xx in FIG. 16 generally correspond to their counterpart components 15xx in FIG. 15.

Although the feedforward error correction and feedforward plus feedback correction techniques have been described and illustrated with respect to a particular power amplifier configuration, they are applicable to other power amplifier and related designs as well.

Figure 7:
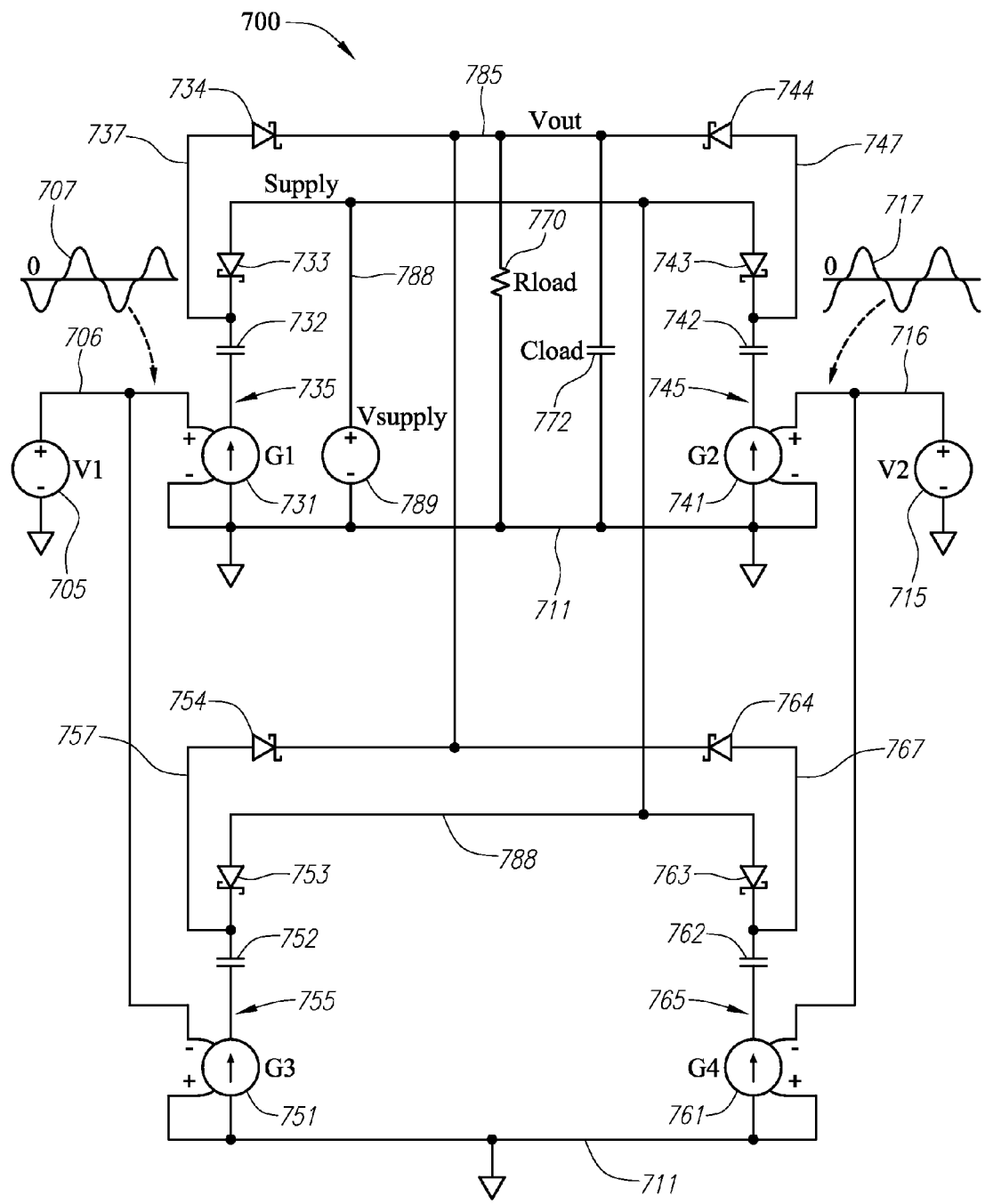
FIG. 7 is a schematic diagram showing an embodiment of a power supply using a similar technique to FIG. 1, but implemented with switched capacitor circuits.

FIG. 7 is a block diagram showing an embodiment of a power supply 700 in general accordance with the principles of the conceptual diagram of FIG. 8, implemented with switched-capacitors. The power supply 700 may, as with the other examples described herein, be supplied by a local power source such as a battery, or by an external power source such as a line source. In FIG. 7, a waveform generator comprising, in this example, a pair of signal generators 705, 715, generates a pair of complementary waveform signals 706, 716, which are preferably periodic in nature, and generally have the characteristics previously described for $V_{IN1}$ and $V_{IN2}$—that is, they are shaped or selected so as to provide a constant DC output after being level-shifted, rectified and combined. Examples of such waveforms are shown as periodic alternating inverted/non-inverted raised cosine signal waveforms 707 and 717 (corresponding to waveform signals 706 and 716 respectively, according to one example). The complementary periodic waveform signals 706, 716 may optionally be provided to a voltage controlled amplifier (VCA) (not shown) for adjusting the amplitude of the waveforms signals 706, 716, based upon a feedback signal (also not shown) received from the DC output signal 785.

Waveform signal 706 is provided to transconductance amplifiers 731 and 751, while waveform signal 716 is provided to transconductance amplifiers 741 and 761. Transconductance amplifiers 731, 741, 751 and 761 output a current proportional to their input voltage, and thus may be viewed as voltage-controlled current sources. The effect of transconductance amplifiers 731 and 741 is that waveform signals 706, 716 will be essentially converted to current waveforms 735, 745 of similar shape. The effect of transconductance amplifiers 751 and 761 is that waveform signals 706, 716 will be essentially converted to current waveforms 755, 765 of similar shape but inverted in nature, due to the fact that waveform signals 706, 716 are coupled to the inverting inputs of transconductance amplifiers 751 and 761. As with the FIG. 5 embodiment, converting to a current-driven waveform may have advantages for downstream processing and may result in improved EMI characteristics. The transconductance amplifiers 731, 741, 751, and 761 may be of similar configuration to those previously described.

For the example illustrated in FIG. 7, the current characteristics of signals 735 and 745 may be characterized by alternating inverted/non-inverted raised cosine waves (with the current waveforms of signals 735 and 745 being identical but offset from one another by 90 degrees), while the corresponding voltage waveforms relating to signals 735 and 745 generally are square waves having a constant positive voltage corresponding to the time period of the non-inverted raised cosine waves, and constant negative voltage corresponding to the time period of the inverted raised cosine waves. Like the current waveforms for signals 735 and 745, the voltage waveforms are identical but offset from one another by 90 degrees. Similarly, the current and voltage characteristics of signals 755 and 765 are inverted from signals 735 and 745. Thus, the current characteristics of signals 755 and 765 for this example may be characterized by alternating non-inverted/inverted raised cosine waves (with the current waveforms of signals 755 and 765 being identical but offset from one another by 90 degrees), while the corresponding voltage waveforms relating to signals 755 and 765 generally are square waves having a constant positive voltage corresponding to the time period of the non-inverted raised cosine waves, and constant negative voltage corresponding to the time period of the inverted raised cosine waves. Like the current waveforms for signals 755 and 765, the voltage waveforms are identical but offset from one another by 90 degrees.

The outputs of transconductance amplifiers 731, 741, 751 and 761 are each coupled to a similar network of components that operate to step up (or down) the input voltage level and provide a level-converted output to the load 770 as a constant DC source signal 785, using principles of, e.g., a charge-boost switched capacitor circuit. The output of the first transconductive amplifier 731 is coupled to a capacitor 732 whose other end is coupled to the input power supply rail 789. The transconductance amplifier 731 serves to periodically charge capacitor 732 in a manner causing the level of applied signal to be stepped up (approximately doubled), thus resulting in a level-converted signal 737. Diode 734 serves to rectify the stepped up (or down) signal 737. In a similar manner, transconductance amplifiers 741, 751 and 761 are coupled to capacitors 742, 752 and 762, respectively, each of which is coupled to the input power supply rail 789 via diodes 743, 753 and 763, respectively. The capacitors 742, 752 and 762 and associated diodes 743, 753 and 763 form switched capacitor circuits that step up (or down) the input signal level, thus resulting in level-converted signals 747, 757 and 767. Rectifying diodes 744, 754 and 764 serve to rectify the stepped up (or down) signals 747, 757 and 767, respectively, in the same manner as rectifying diode 734 relative to stepped up (or down) signal 737. The additive combination of the rectified signals derived from level-converted signals 737 and 757 is, for the example illustrated in FIG. 7, similar to waveform 213 in FIG. 2. The additive combination of the rectified signals derived from level-converted signals 747 and 767 is, for this same example, similar to waveform 214 in FIG. 2 that is, a 90-degree offset version of the same waveform as generated by the additive combination of rectified signals derived from level-converted signals 737 and 757. As noted earlier, the additive combination of waveforms 213 and 214 is a constant DC signal level.

Thus, by combining all four of the rectified signals derived from level-converted signals 737, 747, 757 and 767 together, the end result is a stepped-up (or down) DC signal 785 that is substantially constant in nature, generally without the need for storage/smoothing capacitors. In practice, small amounts of ripple may occur, which can be smoothed out with relatively small smoothing capacitor(s) 772 that may be provided in any convenient location, such as across the load 770. The load 770 is thereby supplied with a constant DC output supply signal. The four-phase design also ensures that the current taken from the supply 789 is substantially ripple free. The example of FIG. 7 illustrates a single stage of voltage step-up, but the same principle can be applied to a multi-stage step-up converter.

Figure 17:
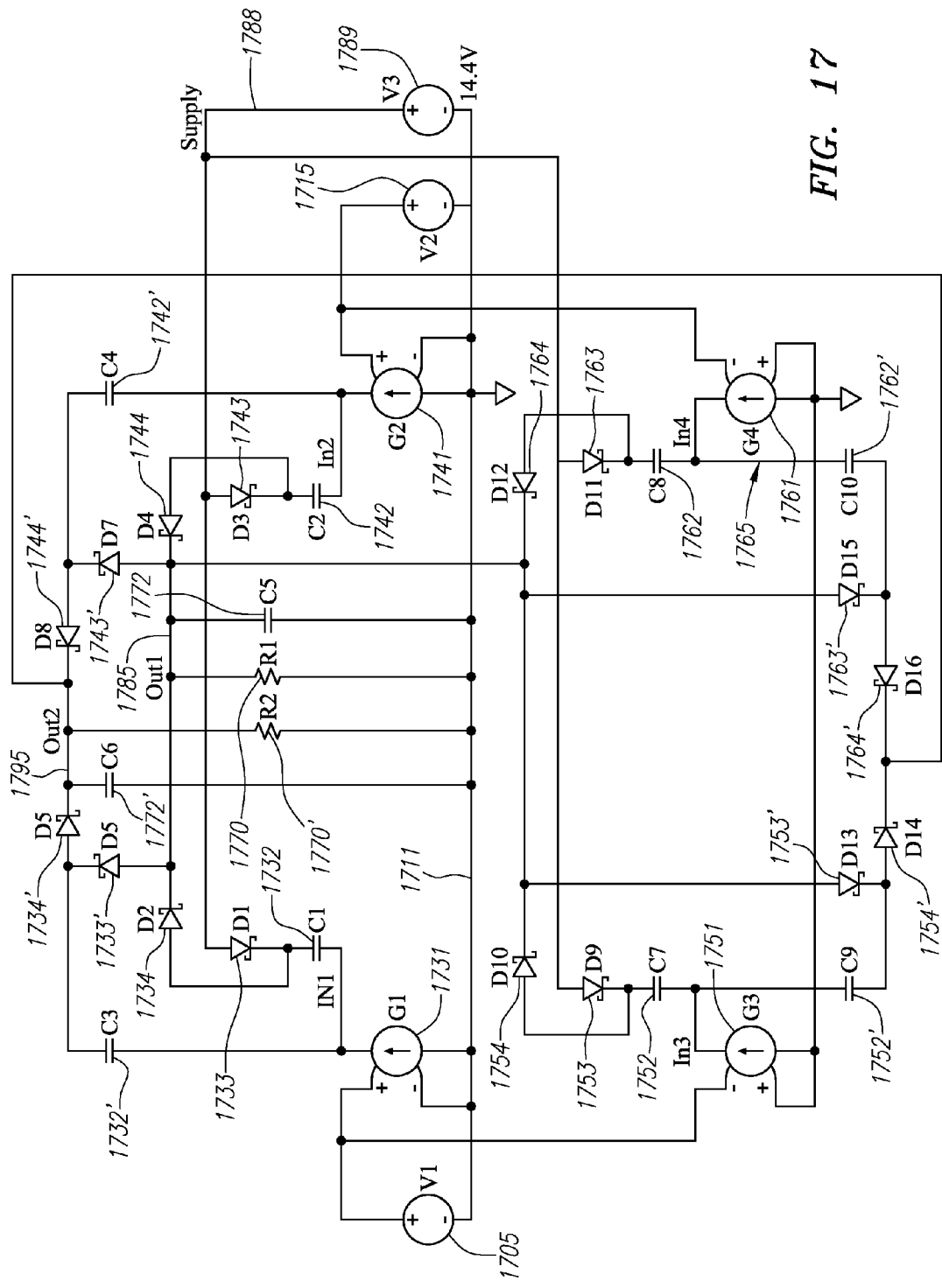
FIG. 17 is a schematic diagram of an embodiment using switched capacitor circuits to form a multi-stage power converter.

In one aspect, FIG. 7 shows a voltage booster using capacitors that provides a single stage of boost, approximately doubling the supply voltage Vsupply. This approach can be extended by the addition of further rectifiers and capacitors as shown, for example, in the embodiment of FIG. 17 to produce a further stage of boost. In FIG. 17, voltage waveforms V1 and V2 may be identical to those of FIG. 7 (i.e., similar to waveforms 707 and 717). The components labeled 17xx in FIG. 17 generally correspond to their counterparts labeled 7xx in FIG. 7. In addition, a second stepped-up (or stepped-down) DC signal 1795 is provided in FIG. 17. Using the same principles of FIG. 7, an additional output capacitor 1772' has been added to the circuit, and charge capacitors 1732', 1742', 1752' and 1762' are periodically charged via diodes 1733', 1743', 1744', 1753', 1754', 1763', and 1764' in a similar manner as the other charge capacitors (1732, 1742, 1752, and 1762) via similar diode/capacitor configurations shown in FIG. 7. No further power amplifier stages are required, although such may optionally be used, and the output and input ripple of the device is still very low. The voltage across the transconductance amplifier outputs remains a square wave, as with FIG. 7, so the overall amplifier of FIG. 17 still can be operated with high efficiency.

Figure 18:
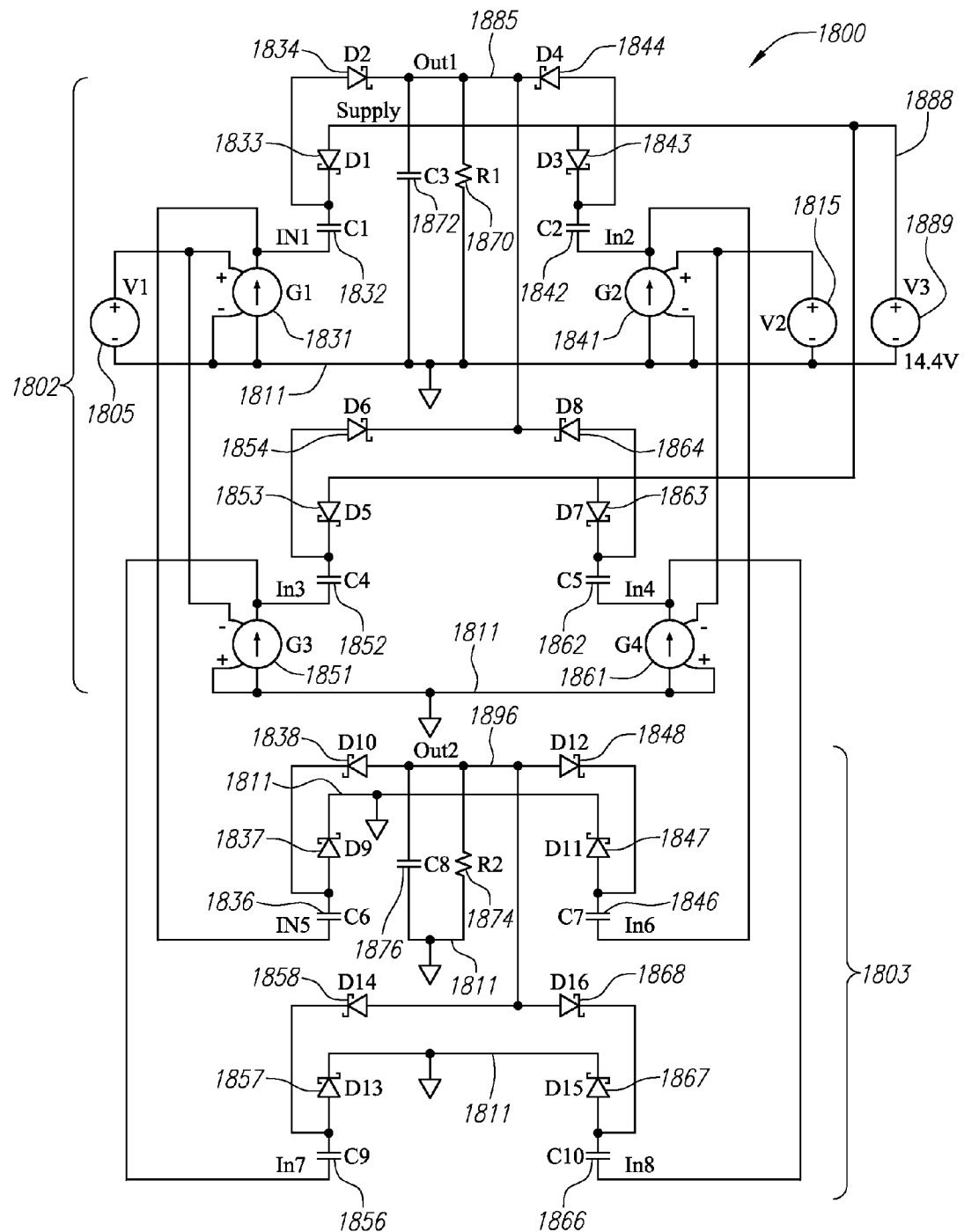
FIG. 18 is a schematic diagram showing a switched capacitor power supply having a combination of positive and inverting boosters circuits.

The technique used for positive boosting as illustrated in FIGS. 7 and 17 can also be used to produce an inverted power supply by changing the polarity of the rectifiers and referencing the charging rectifiers to ground instead of a positive voltage. In the same way that the dual boost supply approach can combine a two-stage boost onto one set of power amplifiers, the same can be done with positive and inverting boosters. FIG. 18 is a schematic diagram showing a power supply with a combination of positive and inverting boosters circuits. Here, the top half of the circuit, i.e., a non-inverting power section 1802, is generally equivalent to the circuit of FIG. 17, while an inverting power supply section 1803 has been added. Thus, in FIG. 18, components labeled 18xx generally correspond to their counterparts labeled 7xx in FIG. 7. In inverting power supply section 1803, additional charge capacitors 1836, 1846, 1856 and 1866 are periodically charged via diodes 1837, 1838, 1847, 1848, 1857, 1858, 1867, and 1868 in a similar manner to the charging capacitors 1832, 1842, 1852 and 1862, but with opposite polarity although using the same input waveforms, so the result is a negative power supply output voltage 1896 across output capacitor 1876. In this manner, the power supply may provide both a positive output voltage 1885 and a negative output voltage 1896 in the same device.

Figure 6:
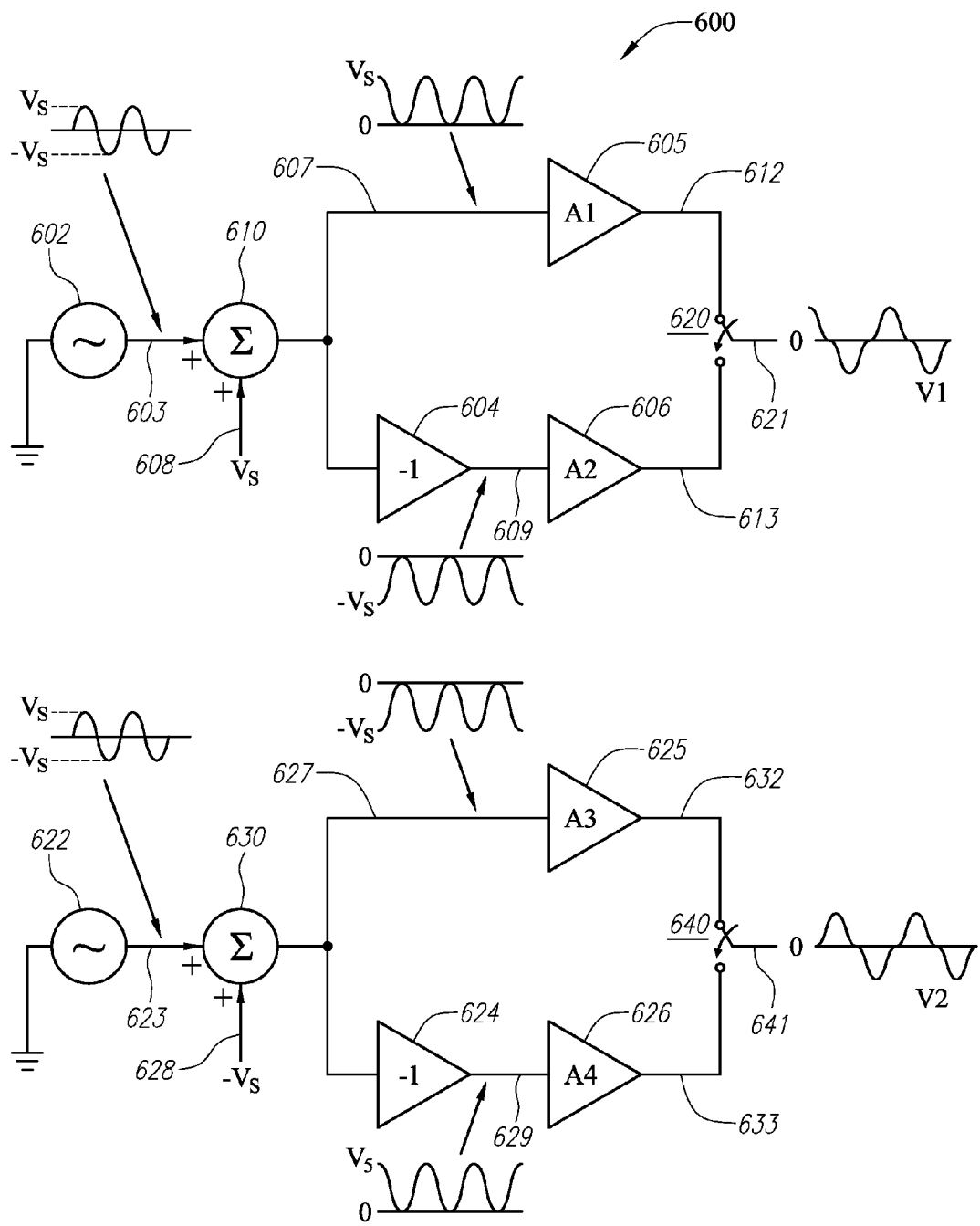
FIG. 6 is a block diagram illustrating one example of a signal generator as may be used in connection with various embodiments as disclosed herein.

FIG. 6 is a simplified block diagram illustrating one example of a signal generator 600 as may be used in connection with various embodiments as disclosed herein, for generating a waveform having alternating inverted/non-inverted raised cosine waves. As shown in FIG. 6, the signal generator 600 may comprise a first sinusoidal waveform generator 602 having an output 603 in the form of a sine wave having peaks at ±Vs. The sine wave signal 603 is coupled as an input to a summer 610. The other input of the summer 610 is a DC input signal 608 that is at a fixed level of +Vs. The resulting signal 607 is a DC offset version of sine wave signal 603, having peaks between ground and +Vs. The DC offset sine wave signal 607 is split into two paths, with one path being provided to an analog inverter 604, which outputs a phase-inverted version of DC offset sine wave signal 607 with peaks between ground and −Vs. The DC offset sine wave signal 607 and inverted DC offset sine wave signal 609 may optionally be provided to a pair of amplifiers 605, 606 for gain adjustment, if desired, with the gain of both amplifiers 605, 606 being the same. The outputs 612, 613 from the amplifiers 605, 606 are DC offset sine waves, phase-shifted with respect to one another, similar to the input signals 607, 609. Switch 620 alternates between outputs 612 and 613, switching between them each time the sine wave from the lower amplifier 606 reaches its top peak, which is the same time that the sine wave from the upper amplifier 605 reaches its lower peak. The result is an output signal 621 that alternates between a "non-inverted" raised cosine wave and an "inverted" raised cosine wave every half-cycle, with a smooth transition between non-inverted and inverted raised cosine waves, as illustrated by the output $V_1$ in FIG. 6.

A similar technique may be used to generate a 90 degree phase-shifted version of output signal 621. The signal generator 600 may comprise a second sinusoidal waveform generator 622 having an output 623 in the form of a sine wave having peaks at ±Vs. Signal 623 is an inverted version of signal 603; thus, signal 623 may also be generated by merely inverting signal 603. The sine wave signal 623 is coupled as an input to a summer 630. The other input of the summer 630 is a DC input signal 608 that is at a fixed level of −Vs. The resulting signal 627 is a DC offset version of sine wave signal 623, having peaks between ground and −Vs. The DC offset sine wave signal 627 is split into two paths, with one path being provided to an analog inverter 624, which outputs a phase-inverted version of DC offset sine wave signal 627 with peaks between ground and +Vs. The DC offset sine wave signal 627 and inverted DC offset sine wave signal 629 may optionally be provided to a pair of amplifiers 625, 626 for gain adjustment, if desired, with the gain of both amplifiers 625, 626 being the same. The outputs 632, 633 from the amplifiers 625, 626 are DC offset sine waves, phase-shifted with respect to one another, similar to the input signals 627, 629. Switch 640 alternates between outputs 632 and 633, switching between them each time the sine wave from the lower amplifier 626 reaches its top peak, which is the same time that the sine wave from the upper amplifier 625 reaches its lower peak. The result is an output signal 641 that alternates between a "non-inverted" raised cosine wave and an "inverted" raised cosine wave every half-cycle, with a smooth transition between non-inverted and inverted raised cosine waves, as illustrated by the output $V_2$ in FIG. 6.

Together, outputs 621 and 641 may be used as input signals $V_{IN1}$ and $V_{IN2}$ in the transformer-based power supply embodiments disclosed herein.

In practical applications, the output signal(s) from the signal generator 600 may be run through a small capacitor or high-frequency filter to remove any residual DC component that may be inadvertently created in the signal generator 600. In addition, various bias current adjustments and other implementation details may be added according to techniques well known in the art.

Figure 9:
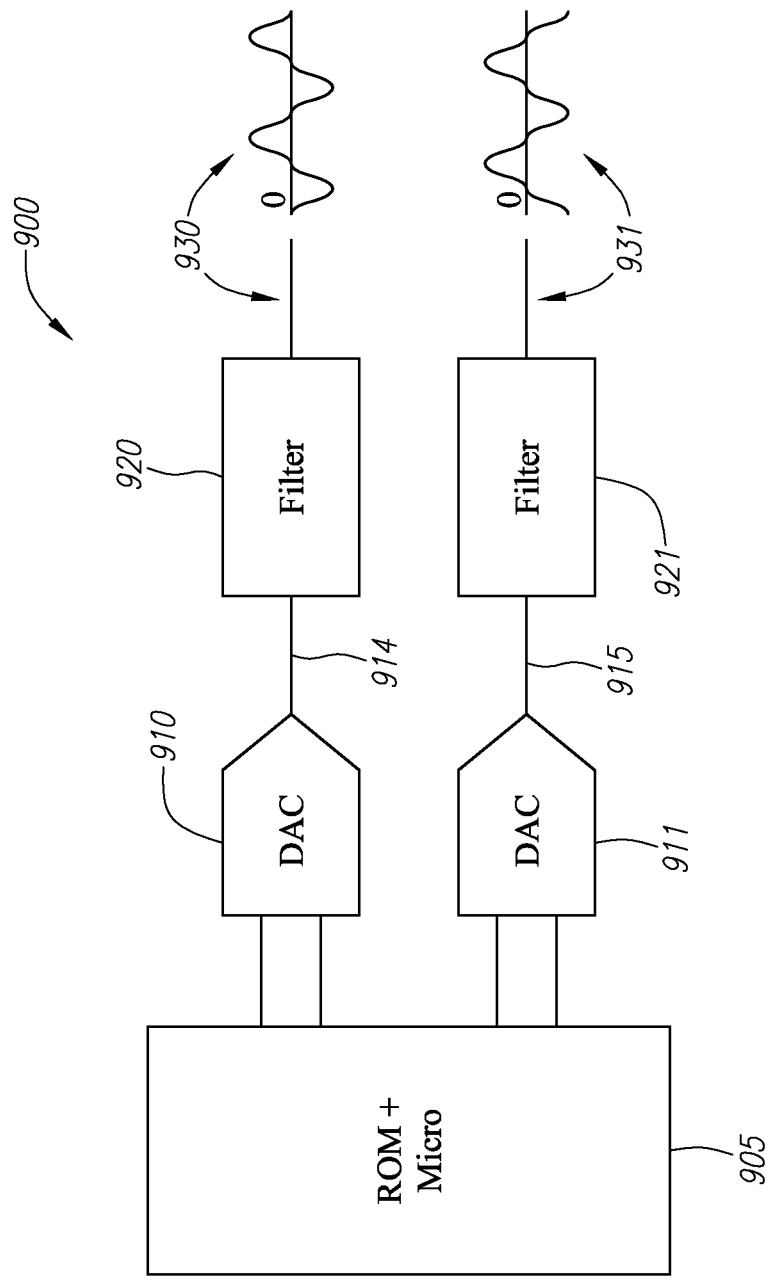
FIG. 9 is a block diagram illustrating a second example of a signal generator as may be used in connection with various embodiments as disclosed herein.

Other techniques may alternatively be used to generate periodic alternating waveforms. For example, digital synthesis can be used to generate similar waveforms to those described above. According to one such implementation illustrated in FIG. 9, a waveform generator 900 stores waveform data in digital form in a lookup table 905 (e.g., a read-only memory (ROM) or other non-volatile memory storage), and reads it out in appropriate sequence under control of a micro-controller, micro-sequencer, finite state machine, or other controller. The digital data may be provided to a pair of digital-to-analog converters (DACs) 910, 911, one for each waveform. That is, the first DAC 910 outputs a first converted waveform 914, and the second DAC 911 outputs a second converted waveform 915 that is identical to but 90 degrees offset from the first converted waveform 914, as previously described. The converted waveforms 914, 915 are provided to filters 920, 921 for smoothing. Together, outputs 930 and 931 may be used as input signals $V_{IN1}$ and $V_{IN2}$ in the transformer-based power supply embodiments disclosed herein.

In other embodiments, a rotorized mechanical generator similar in principle to a hub dynamo may be used to generate a waveform having the characteristics of alternating inverted and non-inverted raised cosine waves that have been previously described, and illustrated in FIG. 2. Such a waveform generator may be particularly suitable for larger-wattage applications of the inventive power supply designs disclosed herein. A hub dynamo generator generally operates by the rotation of a permanent magnet on an axle, with the magnet disposed within a coil of wires. The output of a hub dynamo generator has been observed to be a waveform that has alternating inverted and non-inverted raised cosine waves. Complementary waveforms may be generated, for example, by the addition of a second permanent magnet oriented perpendicularly with respect to the first magnet, on the same axle therewith, but within a second coil of wires separate from the first coil of wires. Two permanent magnets preferably have the same size and physical characteristics, as do the two coils of wires, which may be laterally offset from one another along the length of the axle. Rotation of the axle may be accomplished by any suitable means, including motorized techniques, wind power, or other means. More generally, appropriate waveforms can be generated using a rotary AC power generator having a coil of wires in relative rotational motion with respect to one or more magnetic fields.

Where the power supply is used to convert a relatively high DC voltage to a lower DC voltage, the high-frequency AC waveform produced from a relatively high voltage DC source is, in one aspect, transformed to a lower voltage through one or more small transformers such as illustrated in the various embodiments described herein. The design of power supply may make it possible to avoid the need for large storage capacitors to smooth the output voltage from the transformers after the transformed signals are rectified. Both the input and the output of the power converter can theoretically be made free from ripple at all output levels, so that no extra magnetic components are required for filtering. The elimination of the output storage requirement and elimination of comprehensive filtering may reduce size and cost as compared to, e.g., a conventional switching supply.

As noted previously, in practice some small output capacitance may be required to reduce any residual ripple from the transformer stage or otherwise. Such slight ripple may be caused by inductance inherent in the amplifier stages. It is expected that a capacitance of approximately 300 to 600 nF would be adequate for a 50 Watt power supply operating with periodic waveforms of 25 Kilohertz. This size capacitance is significantly smaller than that needed for a conventional switched power supply.

Another technique that may be employed for reducing any residual ripple at the output is to use a low dropout (LDO) linear regulator. An LDO linear regulator generally may include a power FET disposed in series with the output signal. A differential amplifier controls the power FET in such a way as to maintain a small DC voltage difference between the input and output of the LDO linear regulator. The voltage difference is maintained at a value higher than the peak to peak ripple voltage at the output of the rectifying circuit. The LDO linear regulator is configured to reject the ripple voltage and prevent it appearing at its output, by means of a filter. Since the residual ripple voltage is generally expected to be quite small in the embodiments described and illustrated herein, an LDO linear regulator is one option for reducing or eliminating the residual ripple—thus mitigating or eliminating the need for the small smoothing capacitor that may otherwise be desirable to have at the output, without significantly compromising the efficiency.

Some power supply embodiments as disclosed herein may be built using two transformers. These transformers may be made low profile and thus not significantly impact the overall size of the power supply electronics. For example, for a 200 Watt power supply for an audio system, a pair of toroidal transformers may be used, each approximately 1" in size. The result is power supply that is more compact than a conventional switched power supply of similar wattage.

The power supply designs described herein are not limited to power ranges of a few hundred Watts, but may also be used for much larger DC-to-DC conversion applications, in the Kilowatts or larger.

Embodiments of a power supply as disclosed herein may have significantly reduced EMI as compared with a conventional switched power supply. Where the voltage waveforms appear as in FIG. 2, i.e., periodic inverted/non-inverted raised cosine waves, the corresponding current waveform is a square-wave, which is less desirable from an EMI standpoint. The embodiment of FIG. 5 overcomes those issues by transforming the inverted/non-inverted raised cosine waves to current waveforms before being sent to the transformer stage. The relatively smooth current waveform in this embodiment mitigates EMI concerns. While the corresponding voltage waveform becomes a square-wave, the electrostatic emissions created by the voltage square wave are easier to shield and deal with than the electromagnetic emissions that would be created from a current square-wave.

Figure 10:
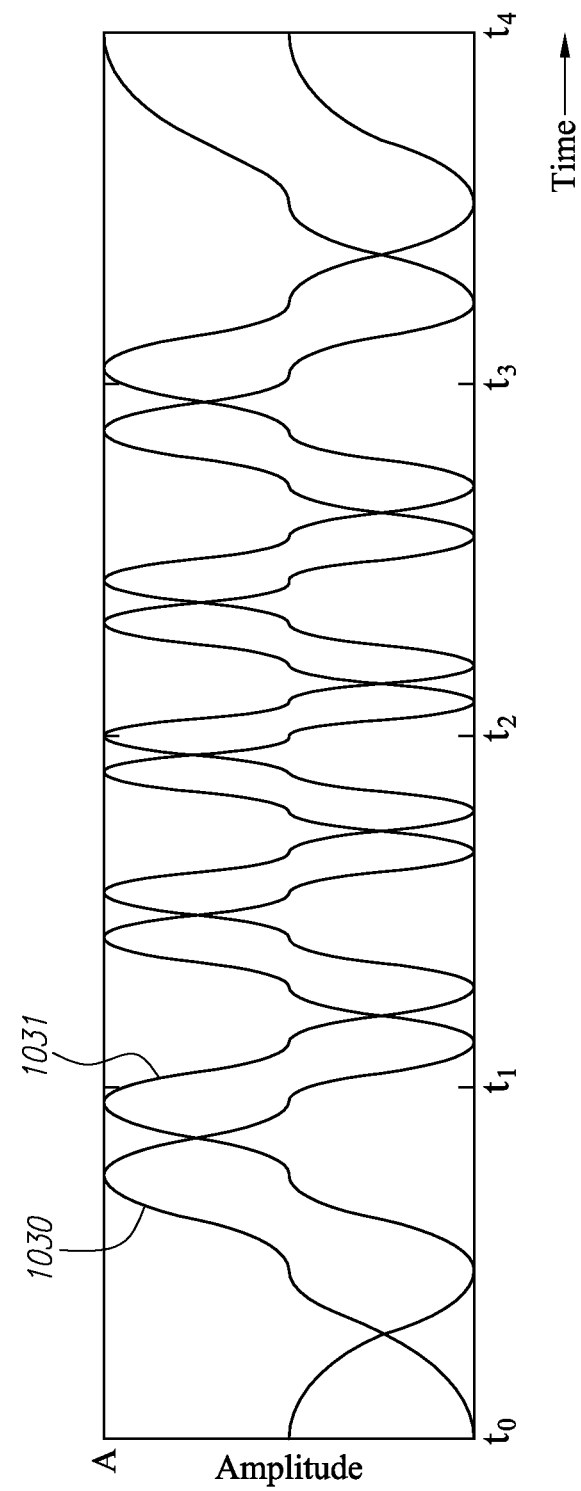
FIG. 10 is a waveform diagram illustrating an example of a pair of frequency modulated signals as may be output by a signal generator.

Although the EMI generated by the described method of DC-DC conversion can be very low due to the low ripple nature of the preferred input and output voltage and current waveforms, it is possible to further reduce the effective EMI emissions by modulating the frequency of the complementary waveforms with respect to time. This type of modulation would cause the spectral components of the residual interference to be spread over a wider spectral bandwidth, thus reducing the average amplitude of the interference at any given frequency. The modulating waveform can be either periodic or random (including pseudo-random) in nature. An example of an illustration of a set of frequency-modulated complementary waveforms 1030, 1031 is shown in FIG. 10. This particular example is based on chirp modulation, with the deviation over time in the wavelengths of waveforms 1030, 1031 exaggerated in FIG. 10 merely for purposes of illustration.

A variety of different transformer designs and techniques may be used in connection with the transformer stage (130, 430 or 530) of the various power supply embodiments described herein. The particular transformer design may be chosen according to the desired application. For example, the transformers may employ bifilar windings, in which the primary and secondary wires are twisted together before being wound around the magnetic core, which may have the effect of reducing leakage inductance. Alternatively, coaxial windings may be used, in which the primary and secondary wires are coaxially combined, which may also reduce leakage inductance significantly.

In terms of transformer shapes and configurations, the transformer(s) may be toroidal, or else may be planar (with spiral windings) to achieve a particularly low profile as well as potentially simpler manufacturing. Another option is to use a winding through a series of hollow cube-shaped magnetic cores, as generally described for example in U.S. Pat. No. 4,665,357 to Herbert, incorporated herein by reference as if set forth fully herein. Yet another possibility is to embed one of the transformer primary/ secondary windings (as a twisted pair or coaxial pair) in a hollowed out groove in the sidewall of a toroidally-shaped magnetic core with squared-off edges, as generally described for example in U.S. Pat. No. 4,210,859 to Meretsky et al, incorporated herein by reference as if set forth fully herein. In this example, the other transformer primary/secondary winding is repeatedly wrapped around the magnetic core, similar to a conventional toroidal transformer, but with the primary/secondary winding being a twisted pair or coaxial pair. Doing this provides magnetic field that are orthogonal and do not interact, and provides increased energy density. This design allows two independent transformers to share the same magnetic core.

Of course, other transformer designs may also be utilized.

The power supply designs and techniques described herein may be used with different types of power inputs, including a local battery power supply or else a line supply that is first converted to an input DC level before being converted to a DC output level. Where an AC line power supply is used, the line AC voltage is first rectified to produce a high voltage DC. While the DC-DC conversion process may then be carried out at relatively high frequencies, unlike the switched-mode power converter, the AC waveform used for this process has very low levels of radio frequency components and so electromagnetic interference is not an issue. The AC waveform, although smooth and with very low EMI, is used in such a way that the supply still retains very high efficiency, typically as good as, or better than, a conventional switched-mode supply.

According to certain embodiments as described herein, the high frequency AC waveform produced from the high voltage DC is again transformed to a lower voltage through one or more small transformers. However, the particular design potentially avoids the need for storage capacitors to smooth the output voltage after rectification. Both the input and the output of the converter can theoretically be made free from ripple at all output levels and so no extra magnetic components are required for filtering. The elimination of the output storage requirement and elimination of comprehensive filtering generally reduces size and cost compared to a switching supply.

The elimination of the output storage capacitors brings a further benefit. A power supply according to embodiments as disclosed herein can respond rapidly to a control signal and so can be employed as a fast tracking power supply for efficient, high quality, low noise and low EMI audio power amplifiers. Where a DC supply is already available, either from batteries or from an external power supply, then the input rectification and storage can be dispensed with and the power supply can then be made with an extremely low profile due to the elimination of the output storage capacitors.

The approach leads to an efficient supply, as there are no or minimal losses associated with EMI reduction and no power device dynamic switching losses to contend with, and so the efficiency in practice can exceed 90%.

The mode of driving the transformers, the elimination of switching artifacts and the simplicity of the control architecture may significantly simplify the design process and shorten the time to market compared to a switched-mode supply.

The inventive power supply designs as described and illustrated herein may find use in a wide variety of applications, including audio devices, portable electronic equipment (e.g., laptops, cellular phones or wireless devices, etc.), military, avionics, medical equipment, solar power conversion, power distribution, and so on.

In various embodiments, a power supply built according to the embodiments described above may find particular utility, for example, in the automobile industry as an on-vehicle power supply for an audio amplifier. Embodiments as described herein may result in a smaller, lighter and/or thinner power supply, that can be less expensive, highly efficient, and with fewer major components, while being relatively benign from the standpoint of EMI. Because the power supply can be simpler to design and produce, it can be brought to market more quickly, thus resulting in a faster product design cycle. Among other things, the low emissions reduce the time and cost for certification. The simple design process, low component costs and low certifications costs result in a considerable cost saving over existing power supply approaches. Also, the low profile, low cost and weight, and very low emissions allow the use of the inventive power supply in locations within a vehicle that presently are very difficult to fulfill with switched-mode power supply designs.

For portable battery operated products, the low profile capability offers form factors that are presently difficult to achieve.

For more generalized, heavy duty power distribution applications, the ability to produce a ripple free output without the use of large energy storage components has distinct advantages over conventional approaches.

In various embodiments, a low cost, lightweight, efficient, isolated, fast responding DC output power converter is provided having a very low input and output ripple and very low EMI emissions. The power converter generally requires very little output storage capacity and so can be implemented in very low profile configurations. The design process is also simpler than a conventional switched-mode converter resulting in a quicker design process. Although it may have beneficial use for audio amplifiers, the general principles embodied in the concept allow it to be applied in a wide variety of power conversion applications.

Certain embodiments described herein generate a DC output signal by the combination of two rectified signals having certain characteristics. However, the same principles may be extended to configurations having three or more signals that are rectified and additively combined, provided that adequate waveforms are selected.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:
1. A power supply, comprising:
   a waveform generator outputting a first waveform and a second waveform;
   a first rectification system coupled to said first waveform said first rectification system outputting a first rectified signal;
   a second rectification system coupled to said second waveform, said second rectification system outputting a second rectified signal; and
   a DC output signal formed by continuously additively combining said first rectified signal and said second rectified signal;
   wherein a sum of the first rectified signal and the second rectified signal equals a level of said DC output signal; and
   wherein both of the first rectified signal and the second rectified signal, when non-zero, simultaneously contribute additively to the level of said DC output signal.
2. The power supply of claim 1, further comprising a level conversion circuit interposed between said waveform generator and said first and second rectification system, said level conversion circuit outputting stepped-up or stepped-down versions of said first and second waveforms.
3. The power supply of claim 2, wherein said level conversion circuit comprises a first transformer outputting said first output corresponding to said stepped-up or stepped-down version of said first waveform, and a second transformer outputting said second output corresponding to said stepped-up or stepped-down version of said second waveform.

4. The power supply of claim 3, wherein said first rectification system comprises a first full-wave rectification bridge, and wherein said second rectification system comprises a second full-wave rectification bridge.

5. The power supply of claim 2, wherein said level conversion circuit comprises a first pair of switched capacitor circuits outputting said first output corresponding to said stepped-up or stepped-down version of said first waveform, and a second pair of switched capacitor circuits outputting said second output corresponding to said stepped-up or stepped-down version of said second waveform, said first pair of switched capacitor circuits and said second pair of switched capacitor circuits each including a capacitor and a transconductance amplifier for controlling a current waveshape flowing into the capacitor during a charging phase and flowing out of the capacitor during a discharge phase.

6. The power supply of claim 5, wherein said first rectification system comprises a first pair of rectifiers connected respectively between said first pair of switched capacitor circuits and said DC output signal, and wherein said second rectification system comprises a second pair of rectifiers connected respectively between said second pair of switched capacitor circuits capacitor circuits and said DC output signal, wherein an output of each of said first pair and second pair of rectifiers is connected to said DC output signal.

7. The power supply of claim 6, wherein the first and second waveforms each comprise a periodic sequence of single cycle raised cosine waves alternating with inverted raised cosine waves.

8. The power supply of claim 7, wherein said waveform generator comprises a rotary AC power generator having a coil of wires in relative rotational motion with respect to one or more magnetic fields.

9. The power supply of claim 1, wherein the first and second waveforms each comprise an alternating periodic sequence of non-inverted and inverted waves, said first and second waveforms being identical but offset from one another by 90 degrees.

10. The power supply of claim 1, wherein the first and second waveforms are selected so that after being rectified and additively combined, their additive combination creates a constant voltage level for said DC output signal, without substantial ripple.

11. The power supply of claim 10, wherein the constant voltage level for said DC output signal is generated without an output storage capacitor.

12. The power supply of claim 1, wherein said first rectified signal and said second rectified signal respectively comprise a cosine waveform with a DC offset and sine waveform with the same DC offset.

13. The power supply of claim 1, wherein said first rectified signal, said second rectified signal, and said DC output signal are all voltage signals.

14. The power supply of claim 13, wherein the first rectified voltage signal and said second rectified voltage signal are sinusoidal waveforms offset from one another by 90 degrees, each of said sinusoidal waveforms having a voltage level greater than or equal to zero over each entire waveform cycle.

15. The power supply of claim 13, wherein the first rectified voltage signal and said second rectified voltage signal are sinusoidal waveforms offset from one another by 90 degrees, each of said sinusoidal waveforms being greater than or equal to zero over each waveform cycle.

16. A power supply, comprising:
a waveform generator outputting a first waveform and a second waveform;
a first transformer receiving said first waveform as an input;
a second transformer receiving said second waveform as an input;
a first rectification bridge coupled to an output of said first transformer, said first rectification bridge outputting a first rectified signal;
a second rectification bridge coupled to an output of said second transformer, said second rectification bridge outputting a second rectified signal; and
a DC output signal formed by continuously additively combining said first rectified signal and said second rectified signal;
wherein a sum of the first rectified signal and the second rectified signal equals a level of said DC output signal; and
wherein both of the first rectified signal and the second rectified signal, when non-zero, simultaneously contribute additively to the level of said DC output signal.

17. The power supply of claim 16, wherein the first and second waveforms each comprise a periodic sequence of single cycle raised cosine waves alternating with inverted raised cosine waves, said first and second waveforms being identical but offset from one another by 90 degrees.

18. The power supply of claim 17, wherein said first rectified signal and said second rectified signal respectively comprise a cosine waveform with a DC offset and sine waveform with the same DC offset.

19. The power supply of claim 16, further comprising a feedback signal derived from said DC output signal, provided to said waveform generator, wherein said waveform generator is operative to adjust an amplitude of said first waveform and/or second waveform in response to said feedback signal.

20. The power supply of claim 16, wherein said waveform generator comprises a signal generator having output signals coupled to a voltage-controlled amplifier.

21. The power supply of claim 16, further comprising a first amplifier for amplifying said first periodic waveform positioned before said first transformer, and a second amplifier for amplifying said second periodic waveform positioned before said second transformer.

22. The power supply of claim 21, wherein said first amplifier and said second amplifier are transconductance amplifiers, wherein said first waveform and said second waveform are current waveforms, and wherein said first and second rectified signals are current signals which, when continuously additively combined, form said DC output signal.

23. The power supply of claim 16, wherein said first transformer and said second transformer share a common magnetic core.

24. The power supply of claim 16, wherein said first rectification bridge is a full-wave rectifier comprising a first set of four diodes, and wherein said second rectification bridge is a full-wave rectifier comprising a second set of four diodes.

25. The power supply of claim 16, wherein said first rectified signal, said second rectified signal, and said DC output signal are all voltage signals.

26. A method for power conversion, comprising:
generating a first alternating waveform and a second alternating waveform;
rectifying the first and second alternating waveforms to generate a first rectified signal and a second rectified signal respectively, wherein a sum of said first rectified signal and said second rectified signal at different instants in time equals a substantially constant value; and forming a DC output signal at said substantially constant value by continuously additively combining said first rectified signal and said second rectified signal;

wherein both of the first rectified signal and the second rectified signal, when non-zero, simultaneously contribute additively to the level of said DC output signal.

27. The method of claim 26, further comprising the step of converting the first and second alternating waveforms to a stepped-up or stepped down level prior to rectifying them.

28. The method of claim 27, wherein the step of converting the first and second alternating waveforms to said stepped-up or stepped down level comprises receiving said first alternating waveform at a first transformer and outputting a first level-converted alternating waveform therefrom, and receiving said second alternating waveform at a second transformer and outputting a second level-converted waveform therefrom.

29. The method of claim 28, wherein the step of rectifying the level-converted first and second alternating waveforms to generate said first rectified signal and said second rectified signal respectively comprises applying said first level-converted alternating waveform to a first full-wave rectifier to generate said first rectified signal, and applying said second level-converted alternating waveform to a second full-wave rectifier to generate said second rectified signal.

30. The method of claim 28, wherein a current flow through said first transformer and through said second transformer is continuous without abrupt transitions or discontinuities.

31. The method of claim 28, wherein said first rectified signal, said second rectified signal, and said DC output signal are all voltage signals.

32. The method of claim 27, wherein said step of converting the first and second alternating waveforms to said stepped-up or stepped down level comprises applying said first alternating waveform to a first pair of switched capacitor circuits outputting a first level-converted alternating waveform, and applying said second alternating waveform to a second pair of switched capacitor circuits outputting a second level-converted alternating waveform.

33. The method of claim 32, further comprising coupling at least a first pair of rectifiers between said first pair of switched capacitor circuits and said DC output signal to perform the rectification of said first level-converted alternating waveform, and coupling at least a second pair of rectifiers between said second pair of switched capacitor circuits and said DC output signal to perform the rectification of said second level-converted alternating waveform.

34. The method of claim 26, wherein the first and second alternating waveforms each comprise an alternating periodic sequence of non-inverted and inverted waves, said first and second alternating waveforms being identical but offset from one another by 90 degrees.

35. The method of claim 34, wherein the first and second alternating waveforms each comprise a periodic sequence of single cycle raised cosine waves alternating with inverted raised cosine waves.

36. The method of claim 35, wherein said first rectified signal and said second rectified signal respectively comprise a cosine waveform with a DC offset and sine waveform with the same DC offset.

37. The method of claim 26, wherein the first and second alternating waveforms are selected so that after being rectified and additively combined, their additive combination creates a constant voltage level for said DC output signal, without substantial ripple.

38. The method of claim 37, wherein the constant voltage level for said DC output signal is generated without an output storage capacitor.

39. The method of claim 26, wherein said first alternating waveform and said second alternating waveform are generated using a rotary AC power generator having a coil of wires in relative rotational motion with respect to one or more magnetic fields.

40. A power converter, comprising:
a waveform generator configured to output a plurality of waveforms;
a plurality of rectification systems, each adapted to receive one of said waveforms and output a corresponding rectified signal, thereby forming a plurality of rectified signals, wherein a sum of said plurality of rectified signals equals a substantially constant value; and
a summing circuit coupled to said plurality of rectification systems, said summing circuit operative to generate a DC output signal at a level equal to said substantially constant value by continuously summing said plurality of rectified signals;
wherein said plurality of rectified signals, when non-zero, simultaneously contribute additively to the level of said DC output signal.

41. The power converter of claim 40, wherein said rectification systems are full-wave rectifiers.

42. The power converter of claim 40, further comprising level conversion circuitry interposed between said waveform generator and said plurality of rectification bridges, said level conversion circuitry outputting stepped-up or stepped-down versions of said plurality of waveforms.

43. The power converter of claim 42, wherein said level conversion circuitry comprises a plurality of transformers operative to output said stepped-up or stepped-down versions of said waveforms.

44. The power converter of claim 42, wherein said level conversion circuitry comprises a plurality of switched capacitor circuits operative to output said stepped-up or stepped-down versions of said waveforms.

45. The power converter of claim 40, wherein said waveforms are exactly two in number, and wherein said plurality of rectified signals are exactly two in number.

46. The power converter of claim 45, wherein said waveforms each comprise a periodic sequence of single cycle raised cosine waves alternating with inverted raised cosine waves.

47. A power conversion apparatus, comprising:
a waveform generator operative to output a first time-varying waveform signal and a second time-varying waveform signal;
a first rectification system coupled to said waveform generator, said first rectification system operative to output a first full-wave rectified signal in response to said first time-varying waveform signal; a second rectification system coupled to said waveform generator, said second rectification system operative to output a second full-wave rectified signal in response to second time-varying waveform signal; and
a summing circuit coupled to said first rectification system and to said second rectification system, said summing circuit operative to form a DC output signal by continuously summing said first full-wave rectified signal and said second full-wave rectified signal;
wherein a sum of the first full-wave rectified signal and the second full-wave rectified signal equals a level of said DC output signal; and
wherein both of the first full-wave rectified signal and the second full-wave rectified signal, when non-zero, simultaneously contribute additively to the level of said DC output signal.

48. The power conversion apparatus of claim 47, further comprising level conversion circuitry interposed between said waveform generator and said first and second rectification systems, said level conversion circuitry outputting stepped-up or stepped-down versions of said first time-varying waveform signal and said second time-varying waveform signal.

49. The power conversion apparatus of claim 48, wherein said level conversion circuitry comprises a plurality of transformers operative to output said stepped-up or stepped-down versions of said first and second time-varying waveform signals.

50. The power conversion apparatus of claim 49, wherein a current flow through said first transformer and through said second transformer is continuous without abrupt transitions or discontinuities.

51. The power conversion apparatus of claim 48, wherein said level conversion circuitry comprises a plurality of switched capacitor circuits operative to output said stepped-up or stepped-down versions of said first and second time-varying waveform signals.

52. The power conversion apparatus of claim 47, wherein said waveforms each comprise a periodic sequence of single cycle raised cosine waves alternating with inverted raised cosine waves.

53. The power conversion apparatus of claim 47, wherein said DC output signal is substantially ripple free.

54. The power conversion apparatus of claim 47, wherein said first full-wave rectified signal, said second full-wave rectified signal, and said DC output signal are all voltage signals.

55. The power conversion apparatus of claim 47, wherein said first rectified signal and said second rectified signal are sinusoidal waveforms offset from one another by 90 degrees, both of said sinusoidal waveforms being greater than or equal to zero over each waveform cycle.

\* \* \* \* \*

UNITED STATES PATENT AND TRADEMARK OFFICE
CERTIFICATE OF CORRECTION

PATENT NO. : 8,576,592 B2  
APPLICATION NO. : 12/845631  
DATED : November 5, 2013  
INVENTOR(S) : Owen Jones et al.

Page 1 of 1

It is certified that error appears in the above-identified patent and that said Letters Patent is hereby corrected as shown below:

In the Specification:  
Column 6:  
Line 20, "90" should be --180--;  
Line 21, "sine and cosine" should be --squared sine and squared cosine--; and  
Line 44, "90" should be --180--;

Column 16:  
Line 41, "90" should be --180--;

In the Claims:  
Claim 12, Column 23, line 53, "cosine" should be --squared cosine-- and "sine" should be --squared sine--;  
Claim 14, Column 23, line 60, "90" should be --180--;  
Claim 15, Column 23, line 65, "90" should be --180--;  
Claim 18, Column 24, line 28, "cosine" should be --squared cosine-- and "sine" should be --squared sine--;  
Claim 36, Column 25, line 58, "cosine" should be --squared cosine-- and "sine" should be --squared sine--; and  
Claim 55, Column 28, line 16, "90" should be --180--.

Signed and Sealed this  
Twenty-sixth Day of May, 2015

Michelle K. Lee  
*Director of the United States Patent and Trademark Office*